United States Patent
Kaku et al.

(10) Patent No.: US 7,113,557 B2
(45) Date of Patent: Sep. 26, 2006

(54) NOISE CANCELING METHOD AND APPARATUS

(75) Inventors: Takashi Kaku, Kawasaki (JP); Ryoji Okita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 627 days.

(21) Appl. No.: 10/047,132

(22) Filed: Jan. 15, 2002

(65) Prior Publication Data
US 2003/0002590 A1    Jan. 2, 2003

(30) Foreign Application Priority Data
Jun. 20, 2001    (JP) .............................. 2001-186276

(51) Int. Cl.
*H03D 1/04* (2006.01)
*H03K 5/01* (2006.01)
*H04B 1/10* (2006.01)
*H04L 25/08* (2006.01)

(52) U.S. Cl. ................. 375/346; 375/148; 375/227; 375/285

(58) Field of Classification Search ............... 375/286, 375/294, 219, 222, 224, 227, 130, 135–137, 375/141, 144–148, 334–335, 346
See application file for complete search history.

(56) References Cited

U.S. PATENT DOCUMENTS

| | | | | |
|---|---|---|---|---|
| 4,630,304 A * | 12/1986 | Borth et al. | ............... | 381/94.3 |
| 5,162,763 A * | 11/1992 | Morris | ........................ | 332/170 |
| 5,535,425 A * | 7/1996 | Watanabe | .................... | 455/436 |
| 6,002,727 A * | 12/1999 | Uesugi | ........................ | 375/346 |
| 6,032,114 A * | 2/2000 | Chan | ......................... | 704/226 |
| 6,263,012 B1 * | 7/2001 | Zhou et al. | ................. | 375/152 |
| 6,351,731 B1 * | 2/2002 | Anderson et al. | ........... | 704/233 |
| 2002/0064234 A1 * | 5/2002 | Kaku et al. | ................ | 375/285 |
| 2002/0155811 A1 * | 10/2002 | Prismantas et al. | .......... | 455/63 |
| 2005/0002468 A1 * | 1/2005 | Walton et al. | .............. | 375/267 |
| 2005/0025042 A1 * | 2/2005 | Hadad | ........................ | 370/208 |

FOREIGN PATENT DOCUMENTS

| | | |
|---|---|---|
| EP | 0 798 871 | 10/1997 |
| EP | 0 987 829 | 3/2000 |
| WO | WO 98/21849 | 5/1998 |

* cited by examiner

*Primary Examiner*—Kevin Burd
*Assistant Examiner*—Freshteh Aghdam
(74) *Attorney, Agent, or Firm*—Katten Muchin Zavis Rosenman LLP

(57) ABSTRACT

A canceling method and apparatus can achieve a fast communication by improving an S/N value by adaptively canceling a noise with respect to a frequency or band having a large noise by selecting noise canceling band in accordance with a condition of noise being generated. A reception signal contains a specific signal having a specified time position, amplitude and phase. A noise distribution of the specific signal is recognized so as to predict a noise by extracting a frequency band having a larger noise component from a pair of frequencies generated by the insertion of the specific signal. An original transmission signal is reproduced by canceling the predicted noise from the reception signal.

14 Claims, 36 Drawing Sheets

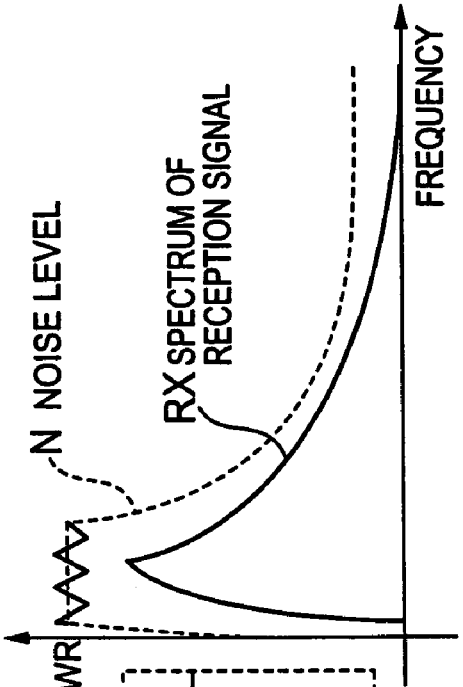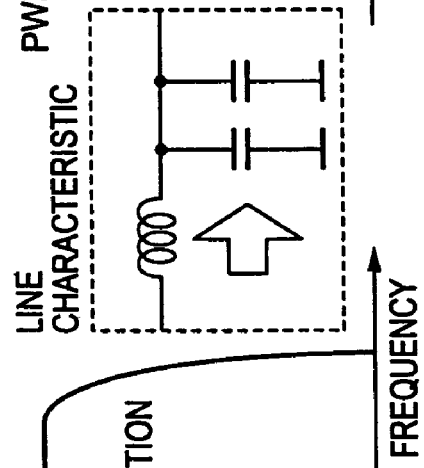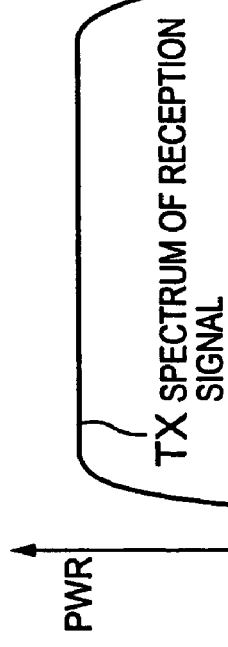

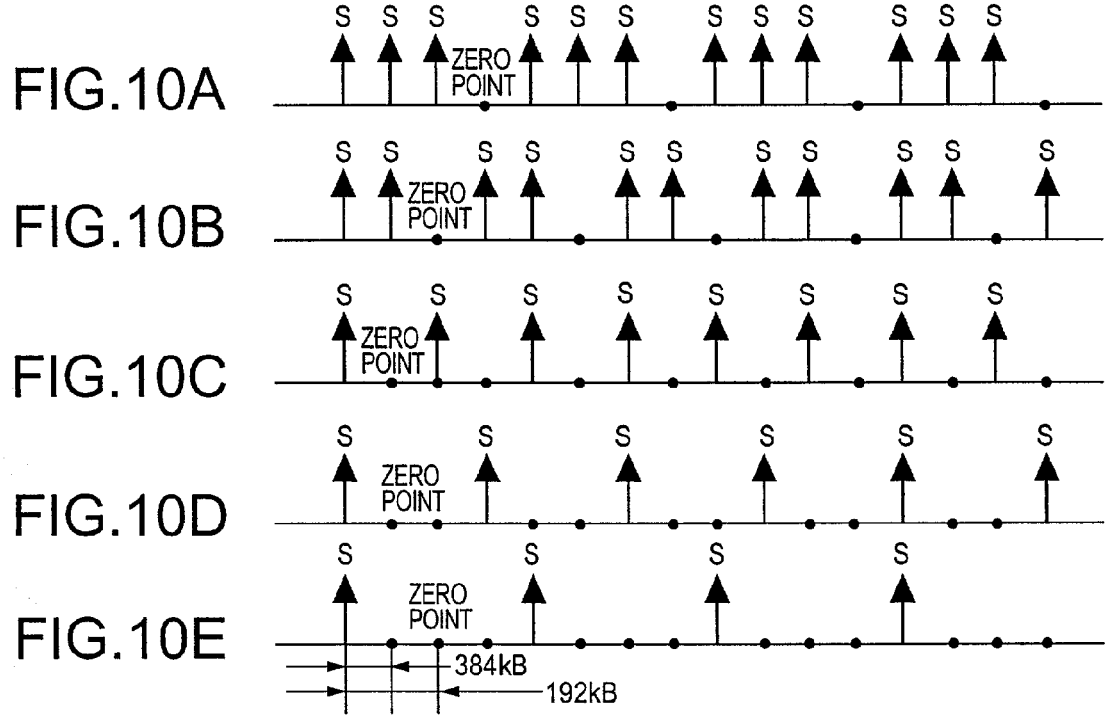

INTERPOLATION PREDICTION BANDWIDTH

INTERPOLATION PREDICTION BANDWIDTH

INTERPOLATION PREDICTION BANDWIDTH

FIG.14A
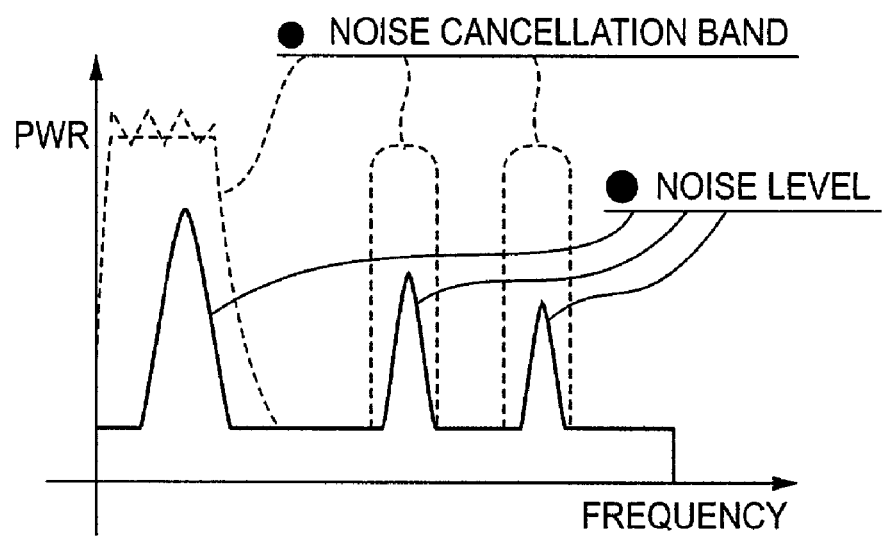
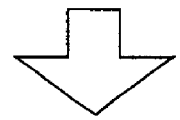
FIG.14B
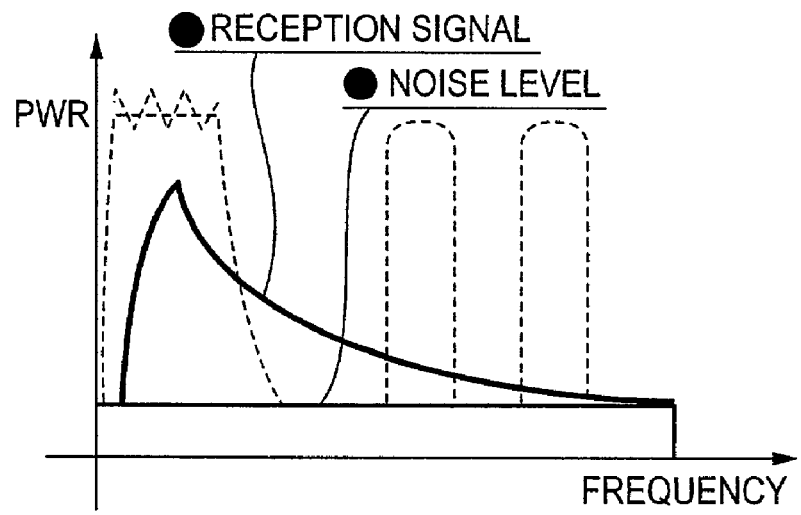

RECEPTION SIGNAL

THINNING AND ZERO POINT INSERTION
(NOISE EXTRACTION)

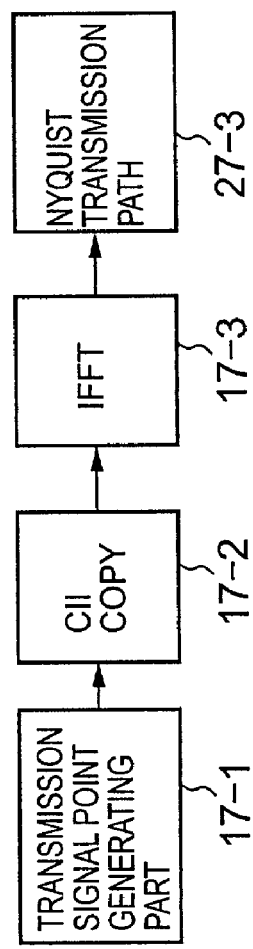
FIG.30A
FIG.30B

NOISE CANCELING METHOD AND APPARATUS

BACKGROUND OF THE INVENTION

1. Field of the Invention

The present invention generally relates to noise canceling methods and apparatuses and, more particularly, to a noise canceling method and apparatus for accurately extracting signals buried in noises in communications under a large noise circumstance.

Such a noise canceling method and apparatus is preferably applicable to apparatuses over various fields as mentioned below.

- a modem for power-line carrier communication for achieving fast data transmission using an electric line such as a power line having many noises;
- a CATV modem, an ADSL modem, a VDSL modem, a radio LAN of 2.4 GHz band, other radio transmission fields and an optical transmission field;
- a magnetic disk drive units or optical disk drive unit for achieving achieve high-density recording by enabling an extraction of signals which tend to be buried in noise under a high-speed operation;
- a semiconductor device using a fast multi-value transmission technology; and
- a demodulation device of a voice recognition apparatus, an image compression apparatus and a barcode scanner under a noisy circumstance.

2. Description of the Related Art

Although a description will be given of an example in which the present invention is applied to a modem for power-line carrier communication as an apparatus used under a high-noise circumference, the present invention is also applicable to an apparatus of various fields.

As shown in FIG. 1, a power of a power supply transformer station 24-1 is supplied to a pole transformer 24-3 via a high-voltage line 24-2 of 6.6 kV, and further supplied to a house 24-6 via a low-voltage line 24-4 of 100 V/200 V and a branch line 24-5.

When a power-line carrier communication is performed in the above-mentioned power line system, an optical fiber (not shown in the figure) is provided between an access node 24-11 of the power supply transformer station 24-1 and the modem provided to the pole transformer 24-2 in parallel to the high-voltage line 24-2 so as to transmit the communication signals via the optical fiber. The communication signals are transmitted between the pole transformer 24-3 and the house 24-6 via the 100 V/200 V low-voltage line 24-4 between a modem, which is plugged into a receptacle connected to interior wiring 24-7 within the house 24-6 and a modem of the pole transformer 24-3.

The above-mentioned power line system is considered The low-voltage line 24-4 is considered to be an inductor of 1 μH/m as shown in FIG. 2B with respect to a spectrum of a transmission signal TX from the modem of the pole transformer 24-3. If the length of the low-voltage line is 150 m, it is considered to be an inductor of 150 μH/m. Additionally, the branch line 14-5 connected to the low-voltage line 24-4 is considered as a capacitor of 75 pF/m. If 50-m branch lines corresponding to 30 houses are connected to the interior wiring 24-7, the branch lines are considered as a capacitor of 0.1125 μF. In addition, each of various electrical appliances connected to the interior wiring 24-7 is provided with a radio interference suppression capacitor between the AC 100 V lines, which provides a large capacitive load.

As a result, when viewing the low-voltage line from the pole transformer 24-3, the low-voltage line is considered as a low-pass filter (LPF) of a low-pass type as shown in FIG. 2B, and a high-frequency component of the reception signal RX greatly attenuates as shown in FIG. 2C. Accordingly, in worst case, the high-frequency component may be buried in noises N when the high-frequency component reaches a communication terminal in the house.

On the other hand, although the low-frequency band component does not attenuate as much as the high-frequency band component, the low-frequency band component is also buried in a large noise N as shown in FIG. 2C since an extremely large amount of random noise (white noise) is emitted from electric appliances using a switching power supply or an inverter device. Accordingly, a fast data communication using a power-line carrier has not been put into practical use, and there has been a demand for finding a solution for a long time.

As a solution of such an issue, various modulation method such as an FM modulation method, an FSK modulation methods or a PSk modulation method, which are said to be resistant to a noise, has been used as a modulation method of a modem for the power-line carrier communication. However, a limited application has been made in practice, such as an application related to a low data transmission speed of less than 1200 bps since the power line has an extremely large noise level.

Additionally, although an attempt has been made to put the power-line carrier communication using a spread spectrum method in practical use, a transmission capacity sharply decreases when an S/N value is a minus value as shown in FIG. 2C under a white noise circumstance. The transmission rate is 100 kbps at maximum, and it becomes incapable of carrying out communication in worst case. Further, an orthogonal frequency division multiplexing (OFDM) method using a multi-carrier modulation method has been introduced so as to attempt an application of a technology to carry out communication while avoiding a carrier band having a lot of noises.

However, the number of switching power source and inverter devices in home electric appliances, which are main source of noises, tends to increase, and it has become further difficult to avoid an attenuation of high-band signals due to the capacitive load. Accordingly, the power-line carrier communication can be put in a practical in a low-speed communication, but it is impossible to achieve the power-line carrier communication at a high rate as high as a few Mbps.

In the future, the number of switching power source and inverter devices in home electric appliances will be increased, and it will become further difficult to avoid an attenuation of high-band signals due to the capacitive load. Under such circumstances, the communication being carried out while avoiding noises in the prior art is not sufficient. Rather, it is effective to positively take measures for noise so as to achieve a fast communication by canceling or removing the noise.

The applicants discloses, in Japanese Patent Application No. 2000-359949 titled "noise canceling method and apparatus", the invention to achieve a fast communication by reproducing reception signals buried in noises, if the S/N value is minus as shown in FIG. 2C, by canceling a low-band noise component having a small signal attenuation. The invention of the prior application extracts reception signals buried in noises by turning the S/N value to a plus value by removing a noise component in a dominant band with respect to a colored noise in a macroscopic view. The band of noise to be canceled is fixed within a predetermined range, and it is effective to a case in which the noise component is particularly concentrated into a low band.

However, there is a case in which a noise having a comb-like spectrum distributed in a wide band is generated due to a noise of use of an inverter provided equipped in home electric appliances or a frequent band noise generated by radio interference by AM broadcasting carrier. In such as case, if only a noise within a predetermined range is cancelled, the S/N value deteriorates which generates frequent reception errors since noises in ranges other than the noise canceling band remain uncanceled.

SUMMARY OF THE INVENTION

It is a general object of the present invention to provide an improved and useful noise canceling method and apparatus in which the above-mentioned problems are eliminated.

A more specific object of the present invention is to provide a noise canceling method and apparatus which can achieve a fast communication by improving an S/N value by adaptively canceling a noise with respect to a frequency or band having a large noise by selecting noise canceling band in accordance with a condition of noise being generated.

In order to achieve the above-mentioned objects, there is provided according to one aspect of the present invention a noise canceling method comprising the steps of: receiving a specific signal having a specified time position, amplitude and phase; recognizing a noise distribution of the specific signal; predicting a noise by extracting a frequency band having a larger noise component from a pair of frequencies generated by insertion of the specific signal; and reproducing a transmitted original signal by canceling the predicted noise from a reception signal.

There is provided according to another aspect of the present invention a noise canceling method comprising the steps of: receiving a reception signal containing a specific signal and a no-transmission energy section during which no periodical transmission is made, the specific signal having a specified time position, amplitude and phase; extracting a noise component from the specific signal of the reception signal, interpolation-predicting a noise of a data signal point, and canceling a noise of a specific band by removing the predicted noise from the reception signal; and recognizing a noise distribution of the no-transmission energy section of the reception signal, predicting a noise by extracting a frequency band having a larger noise component from a pair of frequencies generated by insertion of the specific signal, and canceling a large level noise by removing the predicted noise from the reception signal.

Additionally, there is provided another aspect of the present invention a noise canceling method comprising the steps of: receiving, by a reception side, a reception signal containing a specific signal and a no-transmission energy section during which no periodical transmission is made, the specific signal having a specified time position, amplitude and phase; investigating a noise distribution of the reception signal during the no-transmission energy section; notifying a transmission side of the investigated noise distribution; changing, by the transmission side, an order of channels based on the noise distribution notified by the reception side so that channels having a large noise are gathered in a specific band; sending a signal subjected to the channel change to the reception side; restoring, by the reception side, the order of channels, which has been changed by the transmission side, to an original order; extracting a noise component of a specific band from the specific signal of the reception signal having channels in the restored order; interpolation-predicting a nose of a data signal point; and canceling a noise of the specific band by removing the interpolation-predicted noise from the reception signal.

Additionally, there is provided according to another aspect of the present invention a noise canceling apparatus comprising: means for receiving a specific signal having a specified time position, amplitude and phase; means for recognizing a noise distribution of the specific signal; means for predicting a noise by extracting a frequency band having a larger noise component from a pair of frequencies generated by insertion of the specific signal; and means for reproducing a transmitted original signal by canceling the predicted noise from a reception signal.

Further, there is provide according to another aspect of the present invention a noise canceling apparatus comprising: mans for receiving a reception signal containing a specific signal and a no-transmission energy section during which no periodical transmission is made, the specific signal having a specified time position, amplitude and phase; means for extracting a noise component from the specific signal of the reception signal, interpolation-predicting a noise of a data signal point, and canceling a noise of a specific band by removing the predicted noise from the reception signal; and means for recognizing a noise distribution of the no-transmission energy section of the reception signal, predicting a noise by extracting a frequency band having a larger noise component from a pair of frequencies generated by insertion of the specific signal, and canceling a large level noise by removing the predicted noise from the reception signal.

Additionally, there is provided according to another aspect of the present invention a noise canceling apparatus comprising: means, provided on a reception side, for receiving a reception signal containing a specific signal and a no-transmission energy section during which no periodical transmission is made, the specific signal having a specified time position, amplitude and phase; means, provided on the reception side, for investigating a noise distribution of the reception signal during the no-transmission energy section; means, provided on the reception side, for notifying a transmission side of the investigated noise distribution; means, provided on a transmission side, for changing, by the transmission side, an order of channels based on the noise distribution notified by the reception side so that channels having a large noise are gathered in a specific band; means, provided on the transmission side, for sending a signal subjected to the channel change to the reception side; means, provided on the reception side, for restoring the order of channels, which has been changed by the transmission side, to an original order; means, provided on the reception side, for extracting a noise component of a specific band from the specific signal of the reception signal having channels in the restored order; means, provided on the reception side, for interpolation-predicting a nose of a data signal point; and means, provided on the reception side, for canceling a noise of the specific band by removing the interpolation-predicted noise from the reception signal.

In the above-mentioned invention the specific signal may be a zero point signal having an amplitude of zero, and the zero point signal may be periodically inserted into the transmitted original signal.

According to the present invention, a noise canceling band can be selected in accordance with a state of noise actually generated in scattered bands so as to adaptively applies noise cancellation to the bands having a large noise. Thereby, an S/N ratio is improved and a fast communication can be achieved.

Additionally, an accuracy of recognition of a noise distribution can be improved by combining a low-band noise cancellation and a noise cancellation according to the recognition of a noise distribution, thereby improving an accuracy of entire noise cancellation.

Further, a noise scattering on a high-band side can be effectively canceled by notifying the transmission side of a noise distribution recognized by the reception side so as to change an order of channels on the transmission side based on the noise distribution that noises are gathered to a low band side when the order of the channels is restored to an original order by the reception side.

Other objects, features and advantages of the present invention will become more apparent from the following detailed description when read in conjunction with the accompanying drawings.

BRIEF DESCRIPTION OF THE DRAWINGS

FIG. 2A is a graph showing a spectrum of reception signal; FIG. 2B is a circuit diagram of an equivalent circuit; FIG. 2C is a graph showing a spectrum of the reception signal after being transmitted thorough the circuit shown in FIG. 2B;

FIGS. 10A through 10E are time chart for explaining variations of zero point insertion;

FIG. 14A is a graph showing selection of noise cancellation bands; FIG. 14B is a graph showing a reception signal after noise cancellation;

FIG. 30A is a functional block diagram of an example of zero point insertion; FIG. 30B is a functional block diagram of zero point insertion according to the present invention;

DETAILED DESCRIPTION OF THE PREFERRED EMBODIMENTS

Prior to a description of an embodiment of the present invention, a description will be given of an outline of the prior invention of canceling a noise in which a band for canceling a noise is a fixed range.

Figure 1:
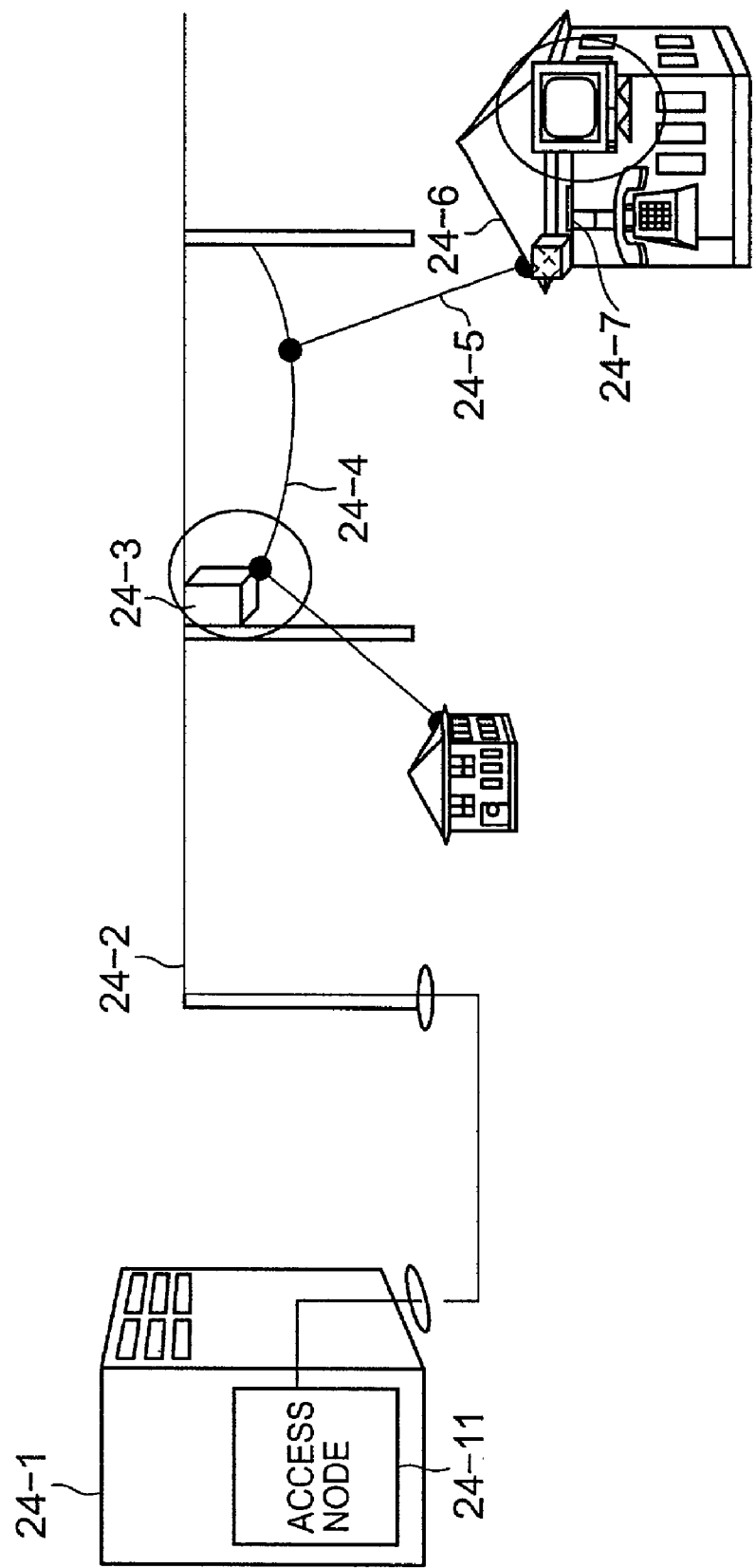
FIG. 1 is an illustration showing a structure of a power-line system.
Figure 3A:
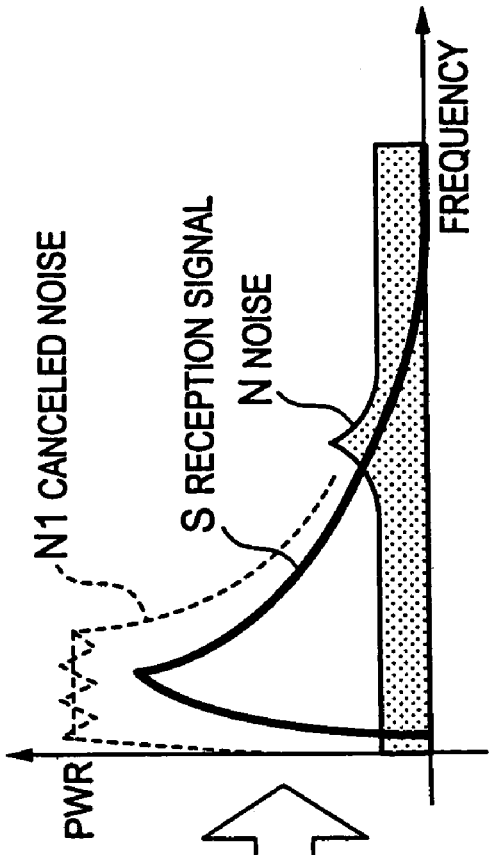
FIG. 3A is a graph showing a noise cut off in a low frequency range.

As shown in FIG. 3A, an S/N ratio is maintained to be a minus value even if a low-frequency range (noise component N1, signal component S1) is cut off so as to transmit data using a high-frequency range.

Figure 3B:
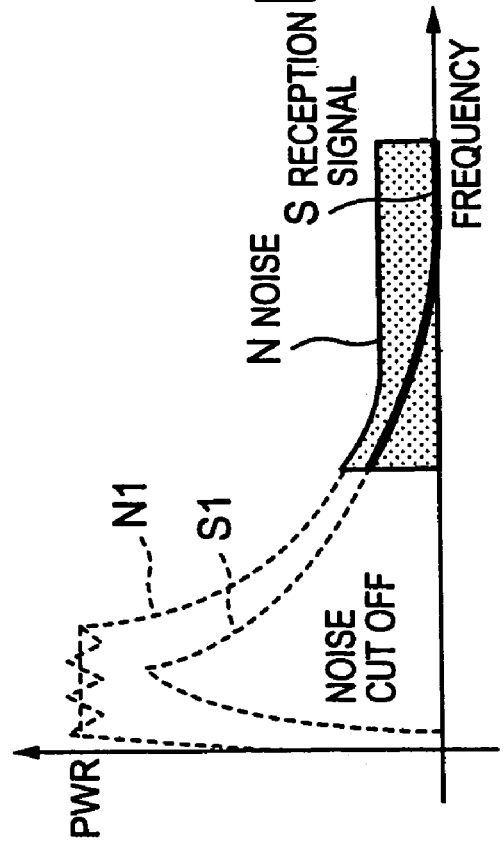
FIG. 3B is a graph showing an extraction of a relatively high-level reception signal buried in noises in the low-frequency range.

However, the S/N value can be turned to a plus value by extracting a relatively high-level reception signal S buried in noises in the low band as shown in FIG. 3B by canceling the dominant noise component N1 in the low band with respect to a noise which is a colored noise in a macroscopic view such as a low-band enhancement type noise as shown in FIG. 3A. The prior invention predicts by interpolation a noise component from the reception signal containing a specific signal having specific time position, amplitude and phase to carry out a noise cancellation so as to reproduce an original transmitted signal by removing the noise component from the reception signal.

Figure 4A:
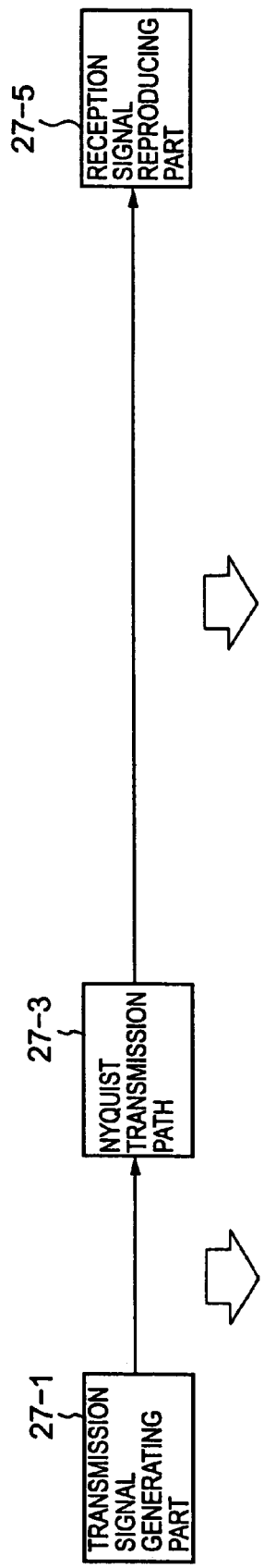
FIG. 4A is a structure diagram of a transmission/reception system according to a prior art.
Figure 4B:
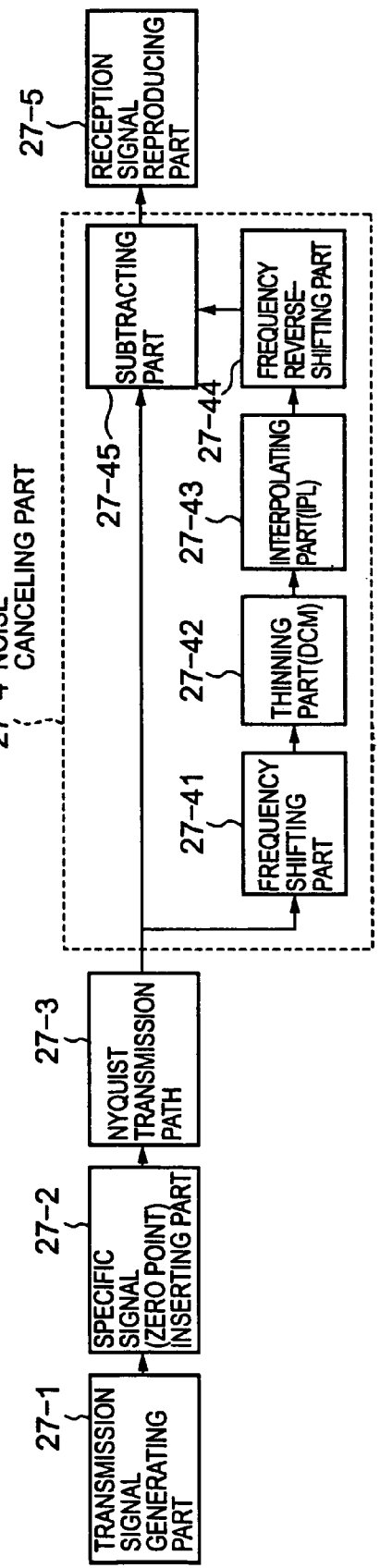
FIG. 4B is a transmission/reception system according to the prior invention.

FIG. 4A is a structure diagram of a transmission/reception system according to a prior art; and FIG. 4B is a transmission/reception system according to the prior invention. As shown in FIG. 4B, on a transmission side, there is provided a zero point inserting part 27-2 between a transmission signal generating part 27-1 and a nyquist transmission path 27-3. The zero point inserting part 27-2 inserts a specific signal having an insertion time position, an amplitude and a phase, which are previously specified. Hereinafter, it is assumed that the specific signal has an amplitude equal to zero and the specific signal is referred to as "zero point signal" or simply referred to as "zero signal".

On the other hand, on a reception side, a noise canceling part 27-4 is provided between the nyquist transmission path 27-3 and a reception signal reproducing part 27-5. The noise canceling part 27-4 comprises a frequency shifting part 27-41, a thinning part (DCM), an interpolating part (IPL) 27-43, a frequency reverse-shifting part 27-44 and a subtracting part 27-45. The noise canceling part 27-4 predicts by interpolation a noise component form the reception signal containing the zero point signal inserted in predetermined time positions and removes the noise component form the reception signal so as to reproduce the original transmitted signal.

Figure 5:
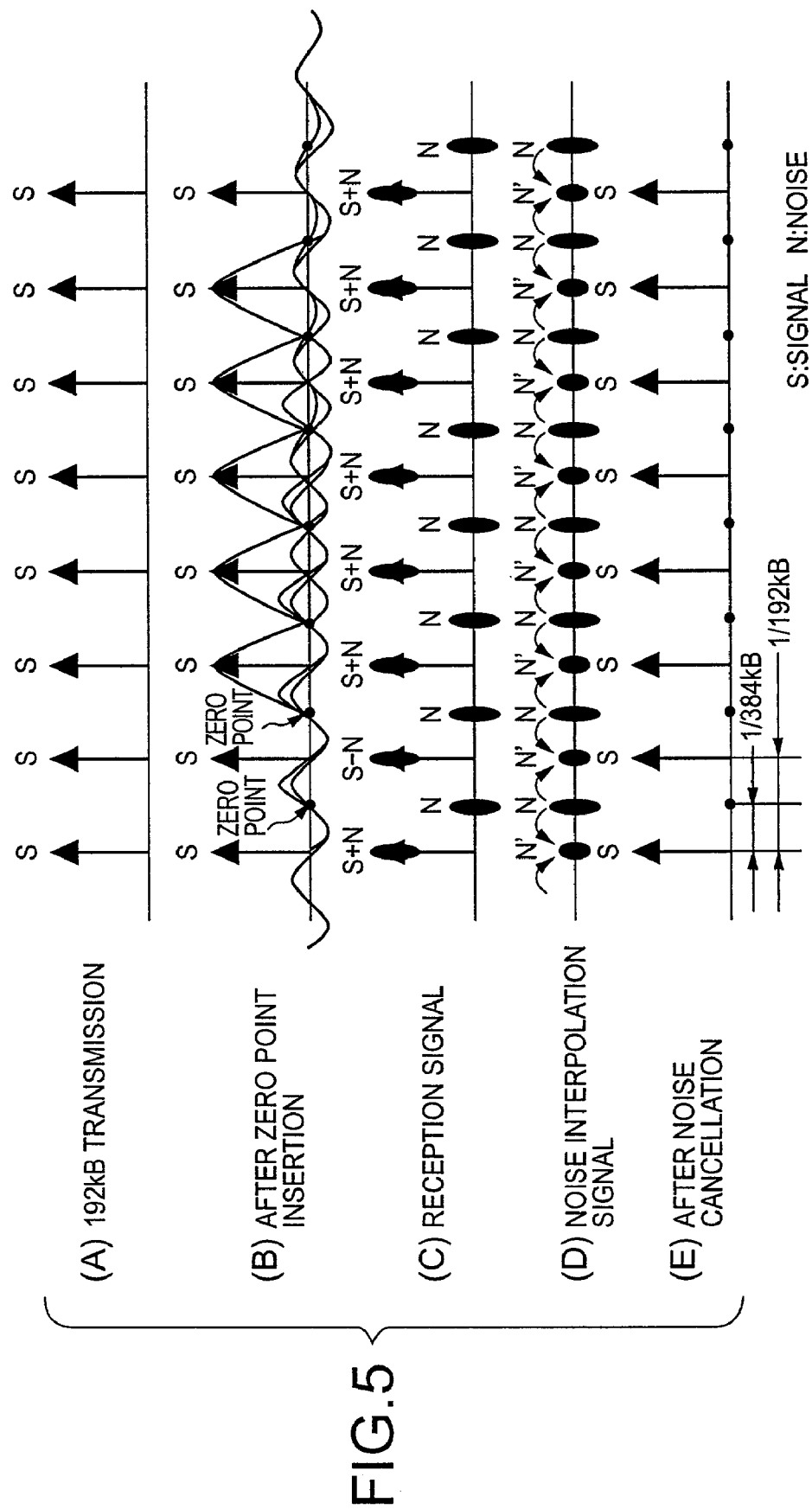
FIG. 5 is a time chart for explaining a noise canceling operation.

First, as shown in FIG. 5-(A), it is assumed that a symbol rate of transmission signals S generated by the transmission signal generating part 27-1 is 192 kB. When the transmission signals S are given to the zero point inserting part 27-2, the zero point inserting part 27-2 inserts the zero point signal between the transmission signals S as show in FIG. 5-(B), and transmits the transmission signals S to the nyquist transmission path 27-3. In this case, if the zero point signal is transmitted at the same rate as the transmission signals S, the transmission symbol rate is 384 kb.

The reception side receives a signal including the transmission signal S and the zero point signal each of which has a noise N added thereto while passing through the transmission path 27-3, as shown in FIG. 5-(C). Accordingly, the noise canceling part 27-4 extracts only the noise N at the zero point, and generates a noise interpolation signal N' for each reception signal point from the noise N on both sides of each reception signal point, as shown in FIG. 5-(D).

Then, by subtracting the noise interpolation signal N' from each reception signal (S+N), a signal (corresponding to the transmission signal) consisting of only the signal component S form which the noise N is substantially canceled can be reproduced as shown in FIG. 5-(E).

A description will be given of an operation of the noise canceling part 27-4 in detail.

Figure 6A:
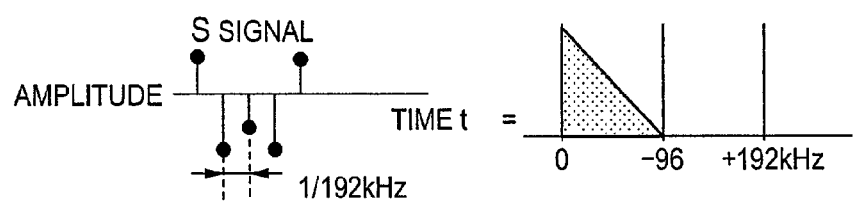
FIG. 6A through 6C are illustrations for explaining a noise canceling operation.
Figure 6B:
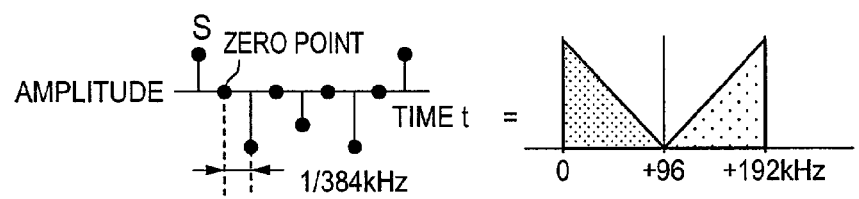

The above-mentioned transmission signal S is transmitted at a rate of 192 kB as shown in FIG. 6A. A spectrum represented by scalar (horizontal axis represents a frequency band kHz) is shown on the right part of FIG. 6A. When the zero point signal is inserted into the transmission signal S as shown in FIG. 6B, the frequency band of the transmission signal after insertion is 384 kb. In this case, a spectrum is mirror copied with a center of +192 kHz.

Figure 6C:
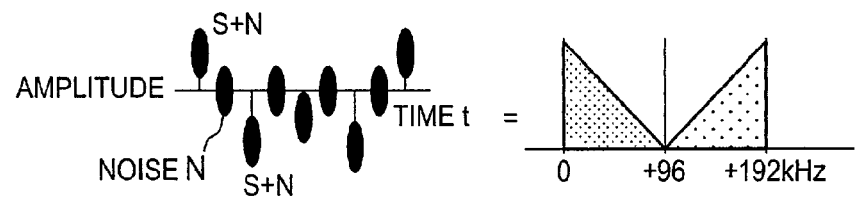

When the transmission signal with the inserted zero point signal is transmitted to the reception side, the noise component N is added to each of the transmission signal S and the zero point signal in the reception signal as shown in FIG. 6C. The spectrum in this case is the same as that shown in FIG. 6B.

Figure 7A:
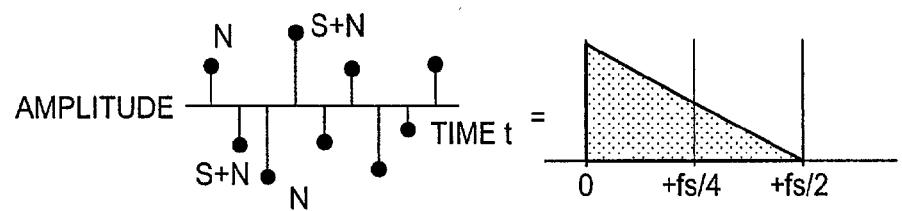
FIGS. 7A through 7D are illustrations for explaining a noise canceling operation when a reception signal is frequency-shifted and is transmitted to a thinning part

FIGS. 7A through 7D show an operation when the reception signal is frequency-shifted by the frequency shifting part 27-41 and is transmitted to the thinning part 27-42. FIG. 7A shows a sampling value S(n) of the reception signal and a spectrum thereof. It should be noted that the spectra shown on the right side of each of FIGS. 7A through 7D distribute 0 to fs/2 (fs is a sampling frequency) since a noise is added in the nyquist transmission path.

The Z transformation A of the sample value S(n) of the reception signal is represented by the following equation.

$$A = S(z) = \Sigma S(n) z^{-n} \quad (1)$$

The Z transformation B of an inverted signal of the reception signal S(n) is represented by the following equation.

$$B = Z[(-1)^n S(n)] = S(-z) \quad (2)$$

The inverted signal in this case is provided with the factor $(-1)^n$ since the inversion is carried out with respect to only the signal component of at the signal point. Additionally, the Z transformation C of a signal t(n) obtained by summing the inverted signal $(-1)^n S(n)$ and the reception signal S(n) is represented by the following equation.

$$C = Z[t(n)] = T(z) \quad (3)$$
$$= (1/2) \times [S(z) + S(-z)]$$

That is, the amplitude at the transmission signal point is zero, thereby canceling not only the signal component S but also the noise component added to the signal S.

Since the signal t(n) is t(1), t(3), , , =0, the signal t(n) can be represented by the following equation.

$$T(z) = \Sigma t(2n) \times Z^{-2n} \quad (4)$$

Figure 7B:
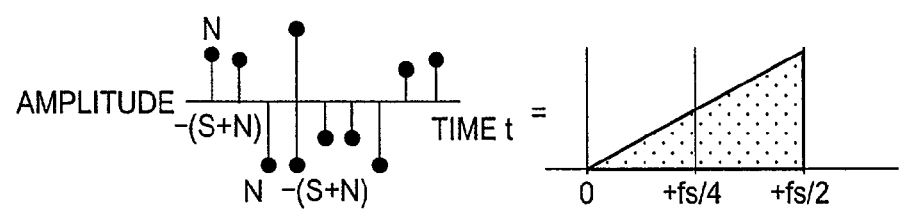
Figure 7C:
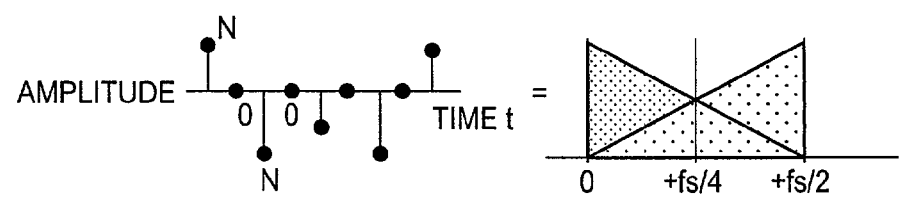

A signal D obtained by thinning the thus obtained signal t(n) shown in FIG. 7C is represented by the following equation.

$$D = u(n) = T(z^{1/2}) \quad (5)$$

Figure 7D:
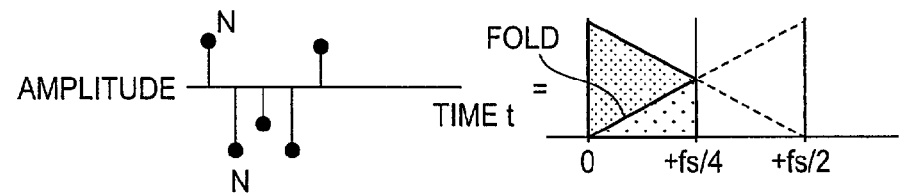

In this case, the transmission rate is down to 192 kB, and the spectrum is folded as shown on the right side of FIG. 7D.

The final signal E=U(z) is given by the following equation.

$$E = [S(z^{1/2}) + S(-z^{1/2})]/2 \quad (6)$$

Figure 8A:
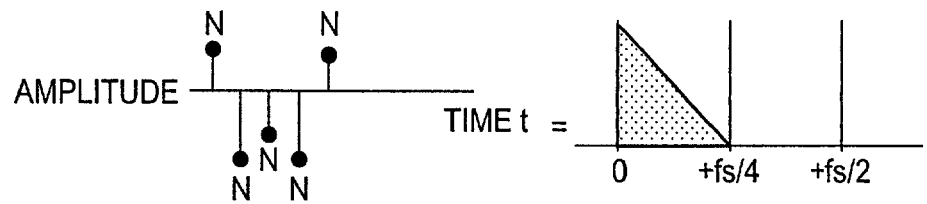
FIGS. 8A and 8B are illustrations for explaining an interpolating operation.
Figure 8B:
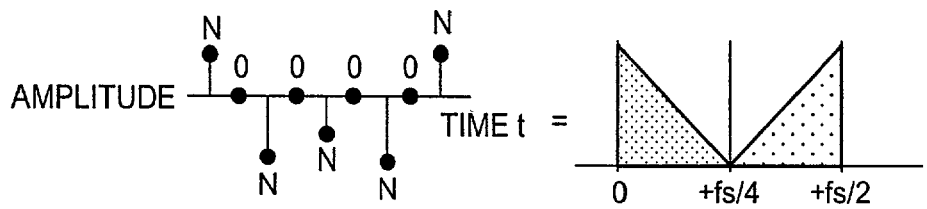

The thus-obtained thinning signal u(n) is provided to the interpolating part 27-43 shown in FIG. 4B so as to achieve an operation shown in FIGS. 8A and 8B. That is, the output signal u(n) of the thinning part 27-42 is only a noise component having a sample value and a spectrum as shown in FIG. 8A and the signal t(n) which is obtained by inserting the zero point signal into the noise component has a sample value and a spectrum as shown in FIG. 8B, and the Z transformation A thereof is represented by the following equation.

$$A=(z)=\Sigma t(n) Z^{-n} \quad (7)$$

Since T(1), t(3), . . . =0, the above equation is changed as follows.

$$A=\Sigma t(2n)Z^{-n}=u(n)^{-2n} \quad (8)$$

Thus, the following equation is given.

$$T(z)=U(z^2) \quad (9)$$

By interpolating the zero point with the noise component N on both sides of the zero point with respect to the signal T(z), a signal having the same transmission rate as the reception signal S(n) shown in FIG. 7A and having only a noise component is obtained. Thus, by subtracting the interpolated signal from the reception signal S(n), the transmission signal to which the zero point signal is inserted as shown in FIG. 7B is obtained. It should be noted that the transmission signal shown in FIG. 7A can be obtained by removing the zero point.

Figure 9:
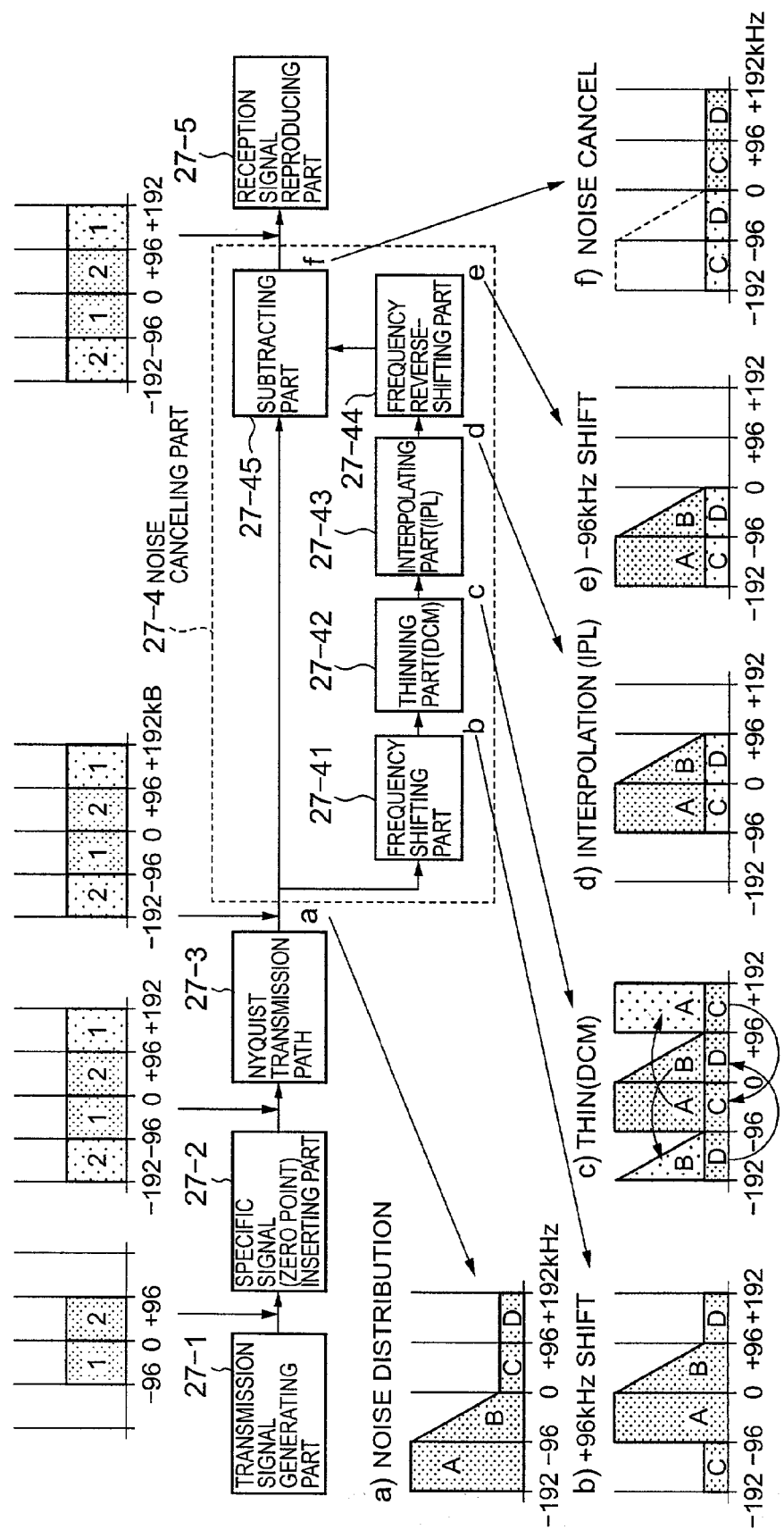
FIG. 9 is an illustration to show how a noise component is removed.

Although the above description indicates how the transmission signal is reproduced on the reception side, FIG. 9 shows how the noise component is removed by paying attention to only the noise component. That is, when the transmission signal has a transmission band of 192 kB (=±96 kB), the band is doubled if the zero point insertion is applied to the transmission signal. Additionally, a copy component is generated, and is transmitted to the nyquist transmission path.

Then, a noise having a noise distribution a over ±192 kB is added to the transmission signal. In the noise distribution a, the noise level is high particularly in the frequency band −192 to 0 kHz in the left half, and low in frequency band 0 to +192 kHz in the right half.

When a shift is made by the frequency shifting part 27-41 of the reception side noise canceling part 27-4 by +96 kHz, a noise distribution b is obtained in which the noise components A and B shift by +96 kHz, and, thereby the noise component D in the noise distribution a is folded as −192 kHz to −96 kHz. Thus, a noise band to be predicted is shifted to the interpolation band, which results in an effective cancellation of a noise.

If a thinning operation is performed in this state, the frequency becomes one half. Accordingly, the noise component A is folded as +96 to +192 kHz, the noise component B is folded as −192 to −96 kHz, the noise component C is folded as −96 to 0 kHz, and the noise component D is folded as 0 to +96 kHz. It should be noted that an amount of shift which is +96 kHz is merely an example, and any frequency can be selected so as to minimize the folded component.

Then, an interpolating operation of the zero point is performed by the interpolating part 27-43, and the noise components (A+C) and (B+D) on each side are removed by filtering, which results that the noise components (A+C) and (B+D) remain in the range of −96 to +96 kHz. When interpolated noise component is shifted in the reverse direction, that is, by −96 kHz, the noise components (A+C) and (B+D) remain only in the range of −192 to 0 kHZ as in the noise distribution e shown in FIG. 9.

Accordingly, the noise distribution f in which the noise components A and B are canceled in the range of −192 to 0 kHz by subtracting the noise components from the entire noise component in the noise distribution a by the subtracting part 27-45. It should be noted that the remaining noise components C and D have a low noise level and, thus, there is no large influence to the S/N value.

As mentioned above, the noise canceled reception signal can be reproduced substantially corresponding to the transmission signal. It should be noted that the reason for carrying out the frequency shift as mentioned above is to set the interpolation predicting band to be the band having a maximum amount of noise (the low band in the above-mentioned example) and to select a band having a small amount of noise with respect to the frequency band to be folded.

It should be noted that a single zero point is inserted between the signal points in FIG. 5 and FIGS. 6A to 6C, while various variations are shown in FIGS. 10A through 10E. That is, in the example shown in FIG. 10A, one zero point is provided to every three transmission signals S, and the noise prediction band is 96 kHz. In the example shown in FIG. 10B, one zero point is provided to every two transmission signals S, and the noise prediction band is 128 kHz. In the example shown in FIG. 10C, one zero point is provided to each transmission signal S, and the noise prediction band is 192 kHz. In the example shown in FIG. 10D, two zero points are provided to each transmission signal S, and the noise prediction band is 256 kHz. In the example shown in FIG. 10E, three zero points are provided to each transmission signal S, and the noise prediction band is 288 kHz.

As shown in FIGS. 10D and 10E, a noise in a larger band can be canceled as the number of inserted zero points is increased. Although the data transmission rate is decreased, a resistance to a worse communication environment is given and the noise resistance is improved.

For example, in a case in which a communication is carried out with a narrow band, a noise cancellation is carried out since the interference between signals is increased, which results in cancellation of the signals themselves. In such a case, the entire rate should be decreased and optimize system parameters so as to effectively cancel a noise without attenuation of the signals. Further, an equalizer may be added before the noise canceling part.

Additionally, the number of zero points to be inserted can be adaptively changed by determining the signal quality on the reception side, determining the number of zero points in response to the determination of the signal quality and notifying the transmission side of the determined number of zero points. Moreover, for example, the zero point insertion may be carried out on the transmission side using a pseudo-random (PN) sequence. Accordingly, the reception side can carry out noise interpolation prediction with respect to a random noise according to the PN sequence.

As for the example of the PN sequence, there are following sequences.

15 chips: 111101011001000
31 chips: 1111100110100100001010111011000

In this case, the zero point can be sequentially inserted while the time axis is shifted as in the Muses method, which is used in an image compression method. There are various other methods to insert the zero point, and optimization may be carried out in accordance with the system characteristics.

Figure 11A:
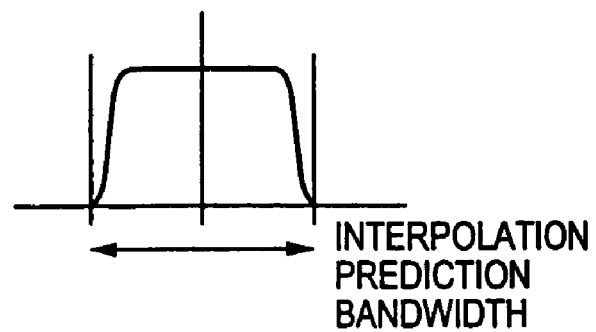
FIGS. 11A through 11C are graphs of various interpolation filters.
Figure 11B:
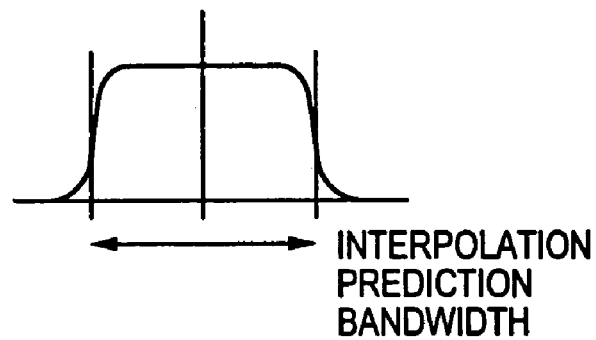
Figure 11C:
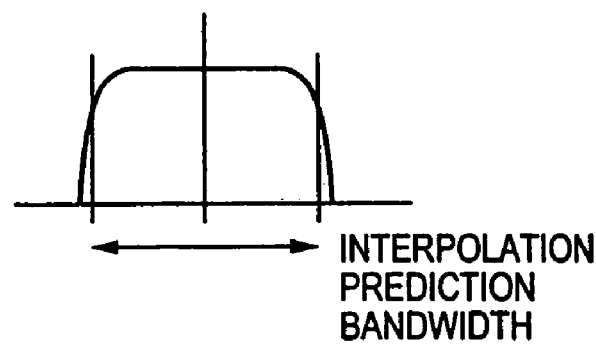

The interpolating part 27-43 shown in FIG. 4B can be constituted by various filters as shown in FIGS. 11A through 11C. A low-pass filter shown in FIG. 11A has a transmission bandwidth equal to a interpolation prediction bandwidth, and has a characteristic that although there is no folding outside the interpolation prediction bandwidth, the number of taps is large when the filter is constituted by a transversal filter and its cancellation range is narrow. A COS square filter shown in FIG. 11B has a nyquist width equal to the interpolation prediction bandwidth, and has a characteristic that the number of taps is small and its cancellation range is large, but folding occurs outside the interpolation prediction range. A COS filter shown in FIG. 11C has a nyquist width equal to the interpolation prediction bandwidth, and has a characteristic that the number of taps is large and an amount of computation is large, and folding occurs outside the interpolation prediction bandwidth.

Figures 12A, 12B:
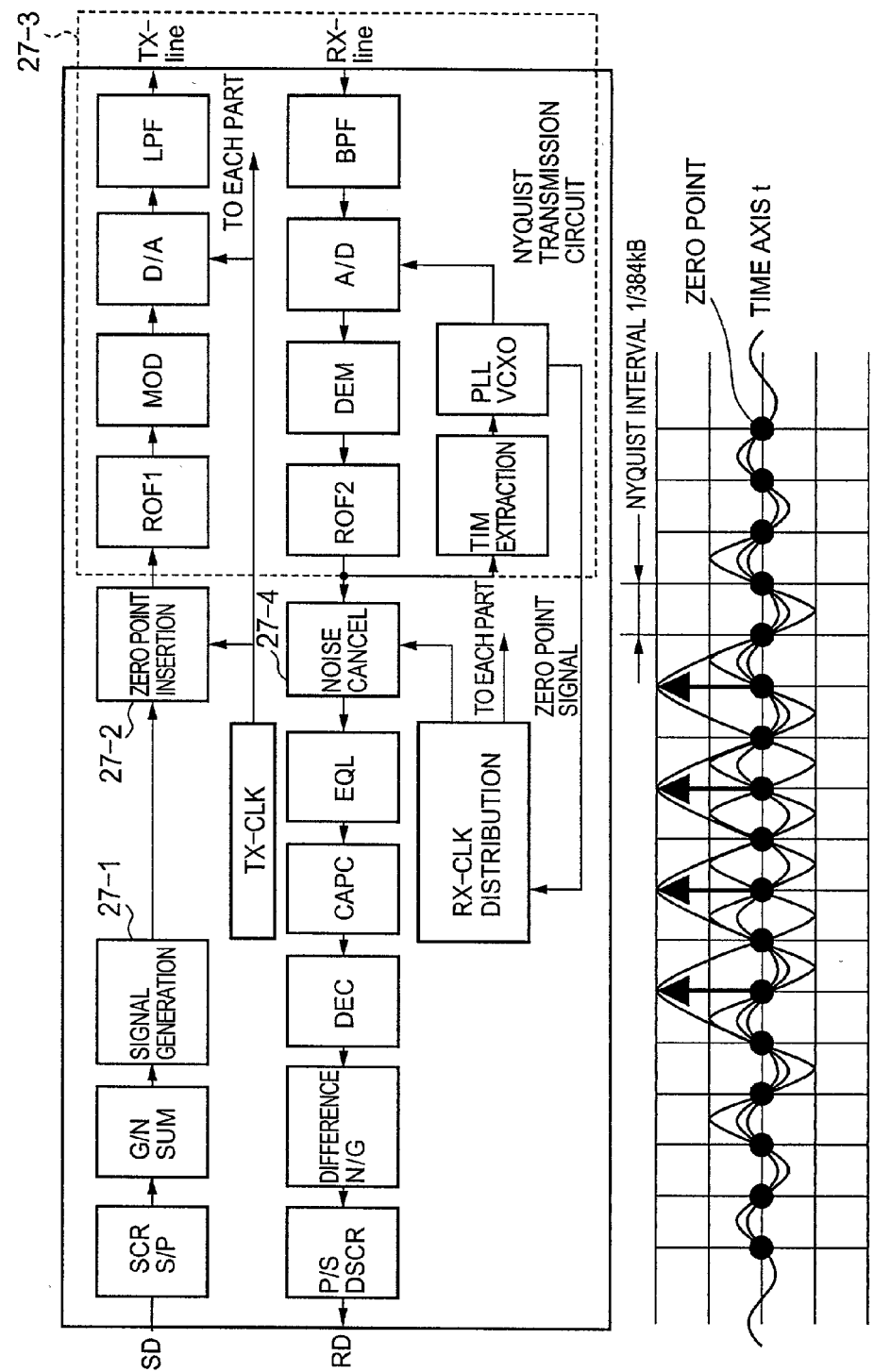
FIG. 12A is a block diagram of a modem for carrying out noise cancellation.
FIG. 12B is a time chart for explaining a nyquist transmission path.

FIG. 12A is a block diagram of a modem, which carries out the above-mentioned noise cancellation. In the structure shown in FIG. 12A, a scrambler (SCR S/R) applies a scramble process to a transmission signal (SD) and converts a serial signal to a parallel signal, sends the transmission signal (SD) to a vector summing circuit (G/N sum). The vector summing circuit (G/N sum) converts the signal, which is a gray binary code (G), into a natural binary code (N) signal with respect to the parallel signal, and carries out a vector summing operation, which corresponds to a vector difference circuit (difference N/G) used for a phase detection on the reception side, and thereafter sends the signal to the transmission signal generating part 27-1.

The transmission signal generating part 27-1 sends the transmission signal S as shown in FIG. 5-(A) and FIG. 6A. After the zero point signal is inserted between the signals S by the zero point inserting part 27-2, the signal is waveform-shaped by a roll off filter (ROF1). An output signal of the roll off filter (ROF1) is modulated by a modulation circuit (MOD), and further converted from a digital signal to an analog signal by a D/A conversion circuit (D/A). Thereafter, a signal of a low-frequency band including the frequency band (10 kHz to 450 kHz) of a power-line carrier is extracted by a low-pass filter (LPF), and the signal is sent to a transmission line TX-line.

The transmission signal sent through the transmission line TX-line is received by a remote modem through a reception line RX-line. A predetermined frequency band component (10 to 450 kHz in a case of a power-line carrier modem) is extracted by a band-pass filter (BPF), and converted into a digital signal by an A/D converter (A/D).

The digitally described analog signal is demodulated to a base band signal by a demodulation circuit (DEM), and waveform-shaped by a roll off filter (ROF2). Then, the output signal of the roll off filter (ROF2) is sent to a timing extracting part (TIM). An output signal of the timing extracting part (TIM) is sent to a voltage controlled crystal oscillator (VCXO) type phase locked loop circuit (PLL VCXO). The phase locked loop circuit (PLL VCXO) extracts a phase of the zero point, and a phase signal of the zero point is supplied to the A/D converter (A/D) as a sampling timing signal, and is also supplied to a clock distributing part (RX-CLK) of the reception part.

The noise component of the transmission path contained in the output signal of the roll off filter (ROF2) of the reception part is removed by the noise canceling part 27-4, an interference between signals is removed by an equalizer (EQL). Then, the signal is subjected to phase-matching by a carrier automatic phase controller (CAPC). Further, a signal determination of the reception signal is carried out by a determination circuit (DEC), and the result of determination is output to a vector difference circuit (difference N/G).

The vector difference circuit (difference N/G) carried out a vector difference calculation reverse to that performed by the vector summing circuit (G/N sum) of the transmission part according to a natural binary code (N), and, thereafter, returns to a gray binary code (G) and sends to a descrambler (P/S DSCR). The descrambler (P/S DSCR) converts the parallel gray code to a serial signal so as to apply a descramble process, and outputs the signal as a reception signal (RD).

Additionally, in the transmission part, the transmission clock distributing circuit (TX-CLK) distributes a transmission clock to the zero point inserting part 27-2, the D/A converter (D/A) and other parts. Moreover, in the reception part, the reception clock distributing circuit (RX-CLK) extracts a reception clock from the VCXP type phase locked loop circuit (PLL VCXO), and distributes the reception clock to the noise canceling part 27-4 and other parts in the reception part.

It should be noted that the reception clock distribution circuit (RX-CLK) merely passes the zero point phase signal extracted by the VCXO type phase locked loop circuit (PLL VCXO), and the zero point phase signal is mere a symbol timing signal. Moreover, a part surrounded by dashed lines in the figure corresponds to the nyquist transmission path 27-3. The nyquist transmission path 27-3 transparently transmits a signal having an interval grater than the nyquist interval (1/384 kb).

Figure 13A:
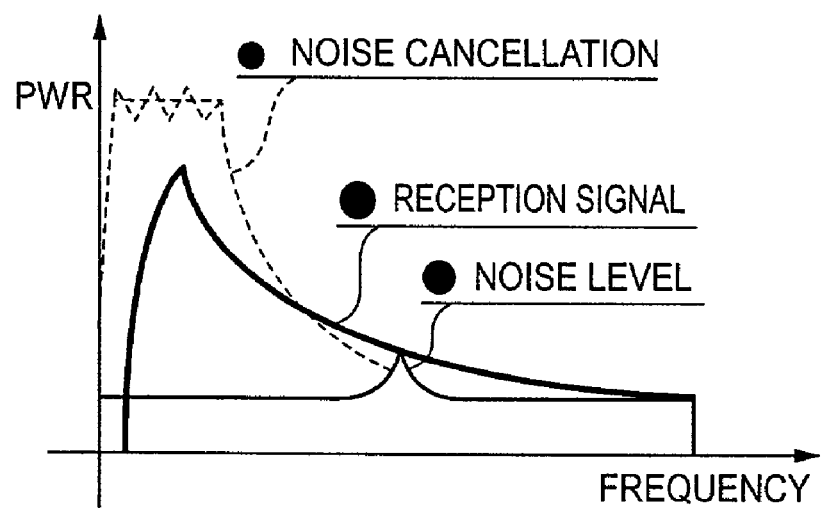
FIG. 13A is a graph showing noise cancellation carried out in a low band.
Figure 13B:
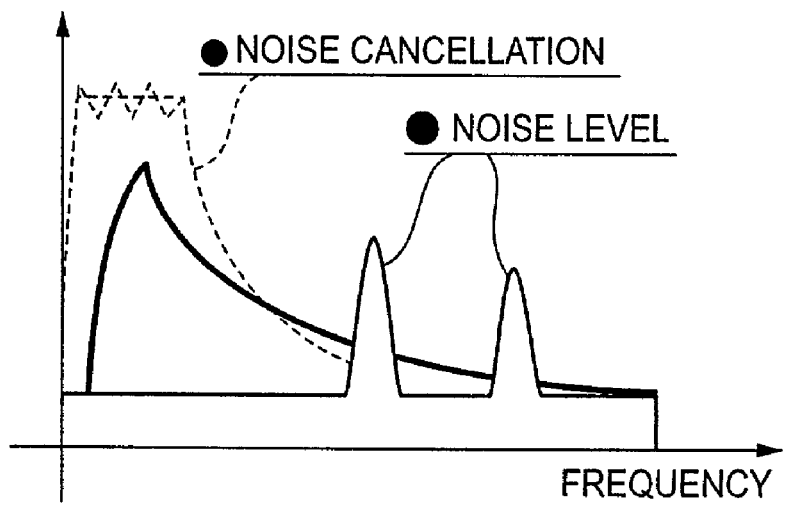
FIG. 13B is a graph showing a remaining comb-like noise.

As mentioned above, there is a case in which a noise having a comb-like spectrum is generated over a wide band due to use of home electric appliances equipped with inverter. In such a case, as even if a noise cancellation is carried out in a low band as shown in 13A, the S/N value cannot be improved since noises remain in bands other than the noise cancellation band as shown in FIG. 13B, which may cause generation of signal errors.

Accordingly, as shown in FIG. 14A, the noise cancellation bands are selected in accordance with a practical noise condition of the reception signal, and frequency bands having a large level noise component are discriminated. Then, a noise cancellation is carried out for the frequency bands having a large noise level so as to cancel large level noises as shown in FIG. 14B so that the S/N value, which was a minus value before noise cancellation, is changed to a plus value after the noise cancellation. For example, a noise cancellation is effectively carried out for noises in scattered bands generated in a wide band transmission in a MHz area caused by an AM broadcasting carrier so as to achieve fast transmission.

Figure 15:
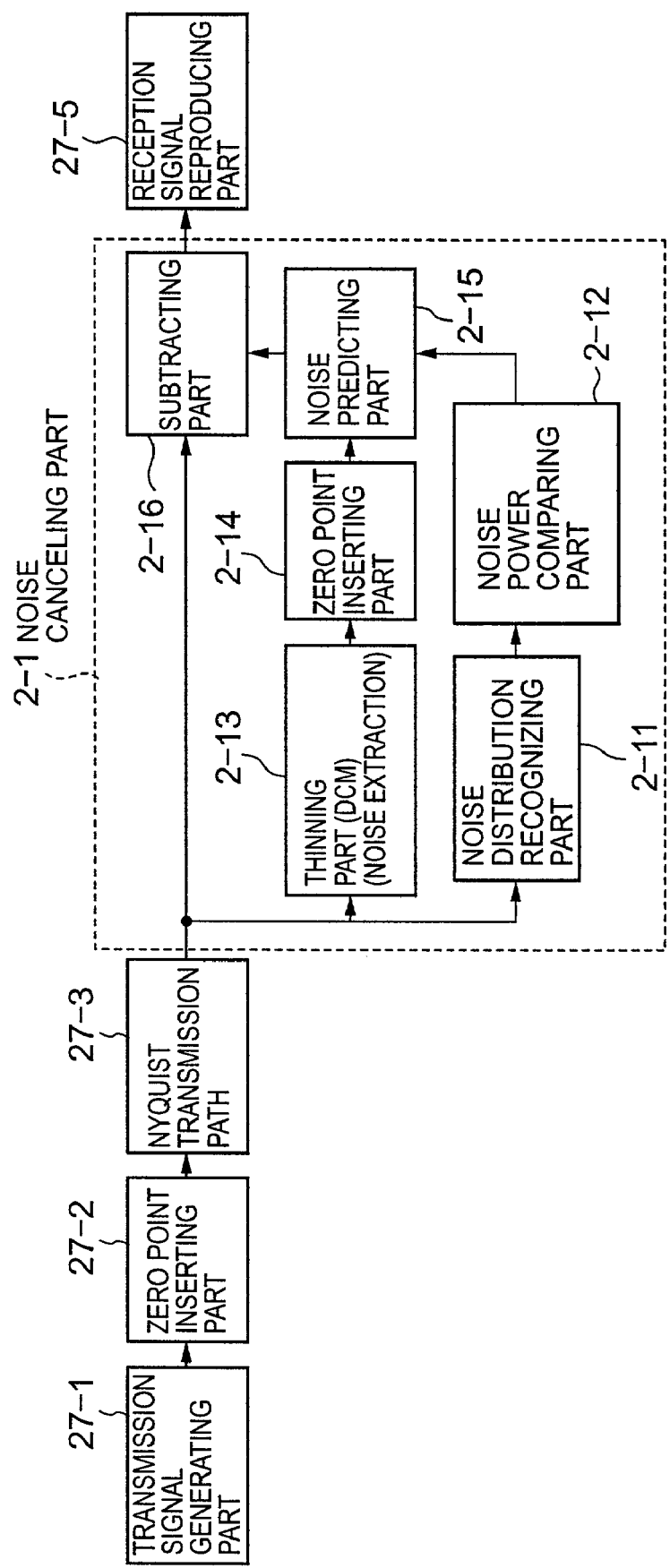
FIG. 15 is a functional block diagram of noise cancellation which carries out a noise distribution recognition.

FIG. 15 shows a functional block diagram of noise cancellation which carries out a noise distribution recognition according to the present invention. The transmission side carries out zero insertion by the zero point inserting part 27-1 in the same manner as in a case in which the aforementioned noise cancellation in a fixed band. The transmission signal having a zero point inserted therein is added with a noise when passing through the nyquist transmission path 27-3.

The reception signal passes through the nyquist transmission path 27-3 is subject to recognition of a noise distribution by a noise distribution recognizing part 2-11 in a noise canceling part 2-1. Then, a comparison is made by a noise power comparing part 2-12 to powers (PWR) of a pair of signals corresponding to copied frequencies generated by the insertion of the zero point on the transmission side, and a determination is made as to a band having a large noise in accordance with the result of comparison.

Then, only a noise component is extracted by a thinning part 2-13, and a zero point if inserted between signals corresponding to the noise components by a zero point inserting part 2-14 so as to return the frequency band to the original frequency band. Then, a predicted noise to be cancelled is generated by a noise predicting part 2-15 by selecting a band having a larger noise, which is determined by the noise power comparing part 2-12. The predicted noise is subtracted from the reception signal by a subtracting part 2-16 so as to carry out noise cancellation.

Figure 16:
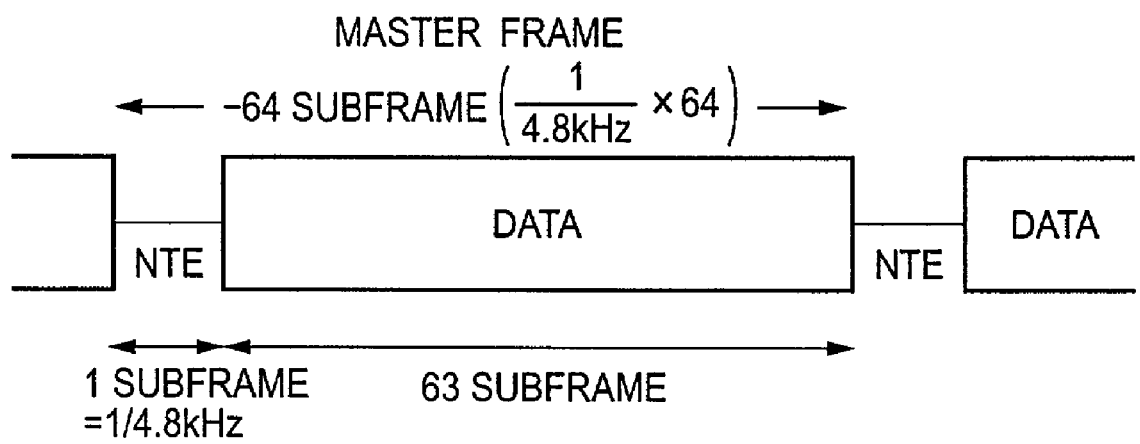
FIG. 16 is an illustration of a transmission frame containing a no-transmission energy section.

A no transmission energy (NTE) section, in which a signal is not periodically transmitted, is provided to a transmission frame so as to recognize a noise distribution on the reception side. FIG. 16 is an illustration of a transmission frame containing the no-transmission energy section. In the transmission frame, a single master frame is constituted by 64 subframes each of which comprises a unit of 4.8 kHz. Among the 64 subframes, one subframe is set as a no-transmission energy (NTE) section so as to be assigned to a section containing only a noise. Master frame synchronization and noise distribution investigation are carried out using the no-transmission energy (NTE) section.

Figure 17:
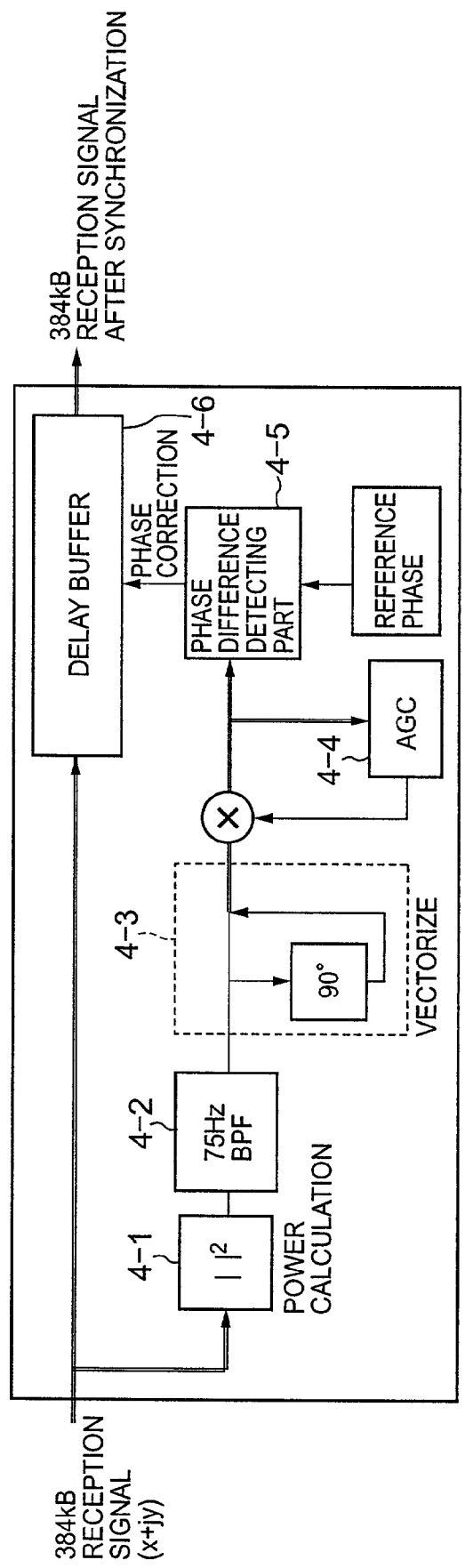
FIG. 17 is a functional block diagram of master frame synchronization according to the present invention.

FIG. 17 is a functional block diagram of the master frame synchronization according to the present invention. In the functional block diagram, a power calculating part 4-1 converts a power of the reception signal (x+jy) into a scalar value, and a band-pass filter 4-2 extracts a component corresponding to the master frame frequency 75 Hz (=4.8 kHz/64). A known secondary band-pass filter can be used as the band-pass filter 4-2.

The 75 Hz-output signal of the band-pass filter 4-2 is vectorized by a vectorizing part 4-3 by converting the signal into orthogonal output signals X, Y having phases different from each other by 90 degrees. An output level is adjusted by an AGC circuit 4-4, and a comparison is made by a phase difference detecting part 4-5 between the reception clock of 75 Hz and a reference phase. A delay buffer 4-6 is notified of the detected phase difference. The reception signal synchronizing with the reference phase is output by shifting a reading pointer of the delay buffer 4-6, which stores the reception signal, by the notified phase difference.

Figure 18:
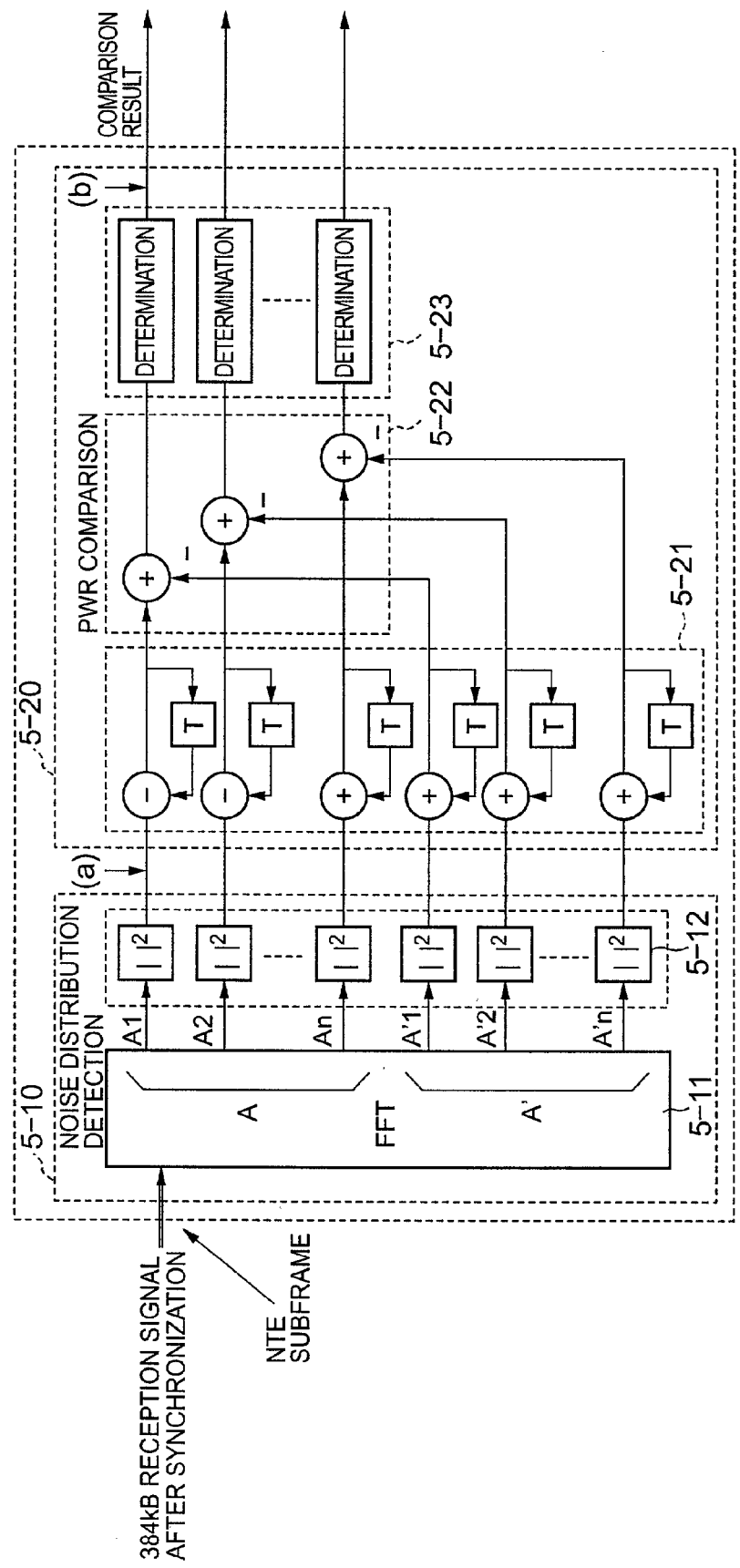
FIG. 18 is a functional block diagram of noise distribution recognition according to the present invention.

FIG. 18 is a functional block diagram of the noise distribution recognition according to the present invention. In the functional block diagram, the reception signal of the no-transmission energy section (NTE subframe) after synchronization of the master frame with the reference phase is supplied to a fast Fourier transforming part (FFT) 5-11 in a noise distribution detecting part 5-10. The fast Fourier transforming part (FFT) 5-11 divides the component of the reception signal into frequency bands the same as that of a fast Fourier transformation being carried out on the reception data. At this time, the fast Fourier transforming part (FFT) 5-11 also outputs a copy component generated by the zero point insertion on the transmission side.

The reception signal of the no-transmission energy section (NTE subframe) contains a component of each frequency band of a noise in the transmission path. A power value of each frequency component of the noise is calculated by a square calculating part 5-12, and the power value is integrated by an integrator 5-21 in a power comparing part (PWR) 5-20. The power value of each frequency band is copied to make a pair of frequency bands so as to compare the power values of the frequency bands with each other by a subtractor 5-22. A sign obtained by the result of comparison is determined by a determining part 5-23 so as to output the result of comparison as a value either "1" or "0".

Figures 19A, 19B:
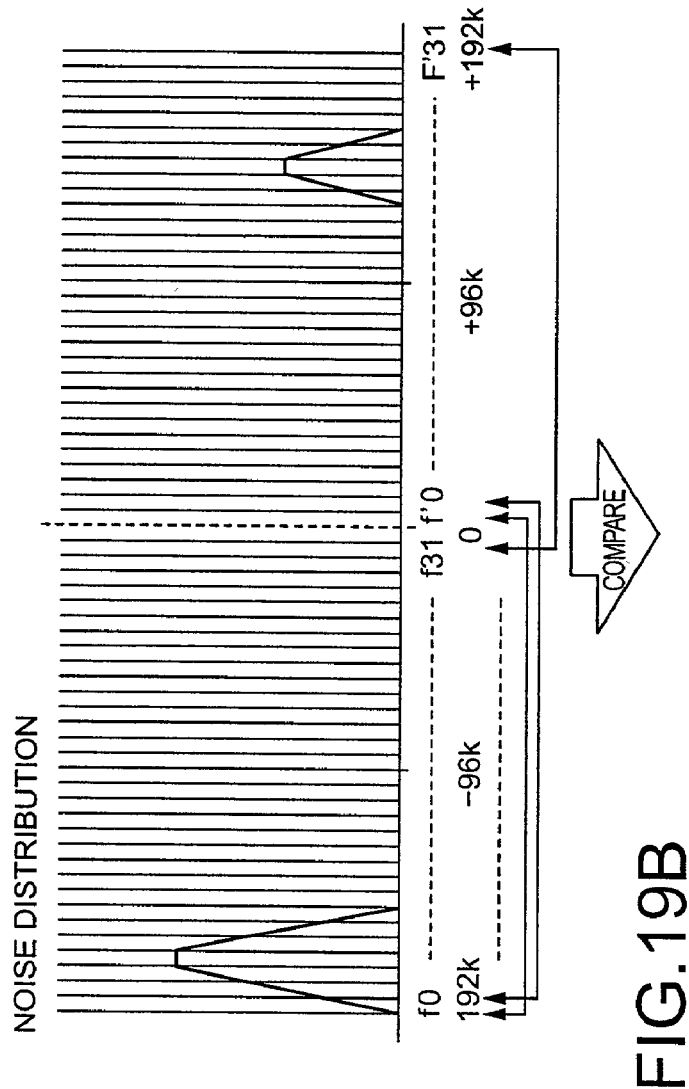
FIG. 19A is a graph showing a distribution of a noise power output from a noise distribution detecting part having a 6-kHz interval.
FIG. 19B is an illustration of a determination by comparison between frequency components having a copy relationship in a power comparing part.

FIG. 19A is a graph showing a distribution of a noise power output from the noise distribution detecting part 5-10 having a 6-kHz interval. FIG. 19B is an illustration of a determination by comparison between frequency components having a copy relationship in the power comparing part 5-20, that is, power values of f0 and f'0, f1 and f'1, ..., f31 and f'31. According to the determination by comparison, a result of determination is output by setting the frequency band having a larger power value to "1" and the frequency band having a smaller power value to "0". If the power values are equal to each other, the lower band is set to "1", and the higher,band is set to "0".

Figure 20:
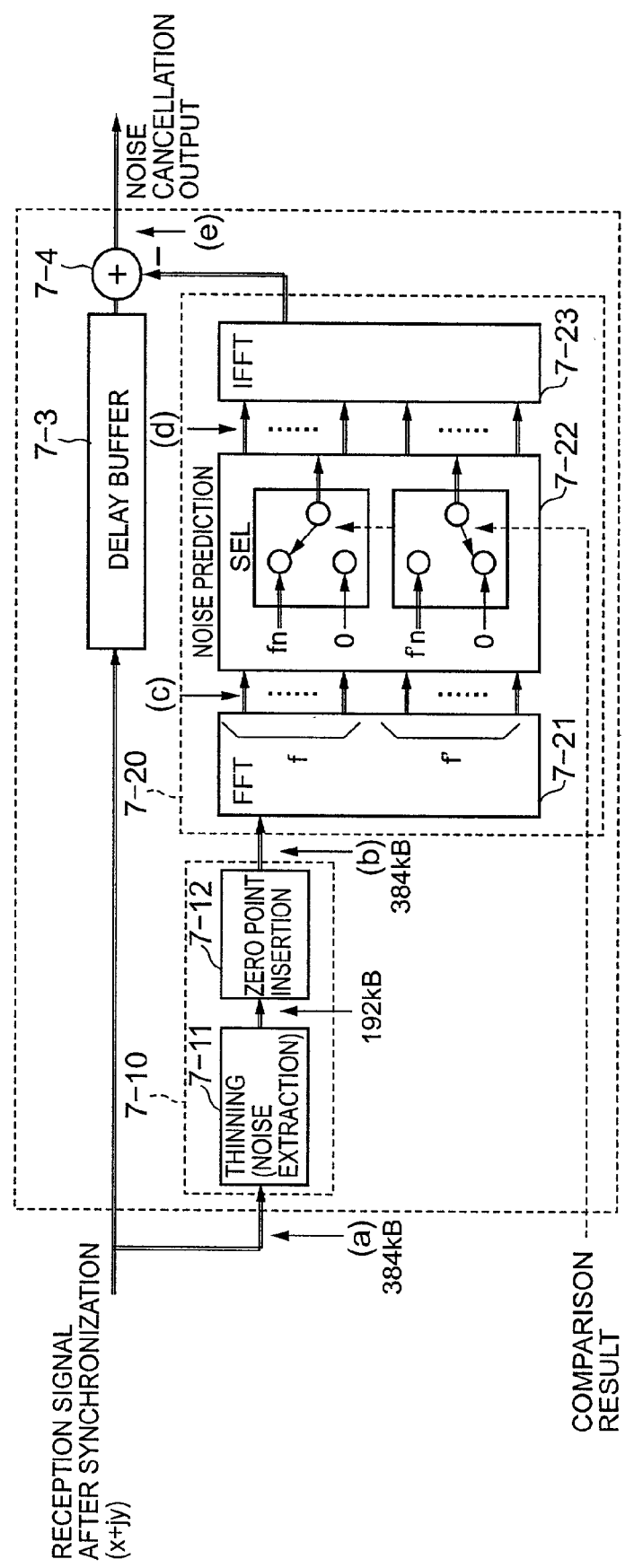
FIG. 20 is a functional block diagram of noise prediction according to the present invention.

FIG. 20 is a functional block diagram of the noise prediction according to the present invention. In the functional block diagram, the reception signal (x+jy) having the master frame in synchronization with the reference phase is supplied to the noise extracting part 7-10. The noise extracting part 7-10 thins out the data signal by a thinning part 7-11 so as to extract only a noise component. Thereafter, a signal (b) having a noise with the zero point inserted by the zero point inserting part 7-12 is generated and outputs so as to return the frequency band having a change caused by the thinning out to the original band.

The signal (b) having only a noise extracted from the reception signal is divided into each component (c) corresponding to each individual frequency band by the fast Fourier transforming part (FFT) 7-21 in the noise predicting part 7-20, and is supplied to a selecting part (SEL) 7-22. The selecting part (SEL) 7-22 selects and outputs the component of the frequency band or zero value in accordance with the value of "1" or "0", which indicate the result of comparison of the noise power values in the pair of frequency bands. That is, the selecting part (SEL) 7-22 outputs a band from which a noise is to be canceled by selecting one of the pair of frequencies having a larger noise component. It should be noted that when the zero point signal is transmitted with a ratio of 1:1 with respect to data signal, the comparison is made between the pair of frequencies. On the other hand, when the zero point signal is transmitted with a ratio of 1:3, there are four frequencies which make pairs and one of the four frequencies is cancelled.

The frequency component (d) of a noise to be cancelled output from the selecting part (SEL) 7-22 is supplied to an inverting Fourier transforming part (IFFT) 7-23. The inverting Fourier transforming part (IFFT) 7-23 returns the noise on the frequency axis to a noise on the time axis, and generates and outputs a noise prediction signal (e). The subtracting part 7-4 subtracts the noise prediction signal (e) from the initial reception of which timing is adjusted by the delay buffer 7-3, thereby canceling the noise.

Figure 21:
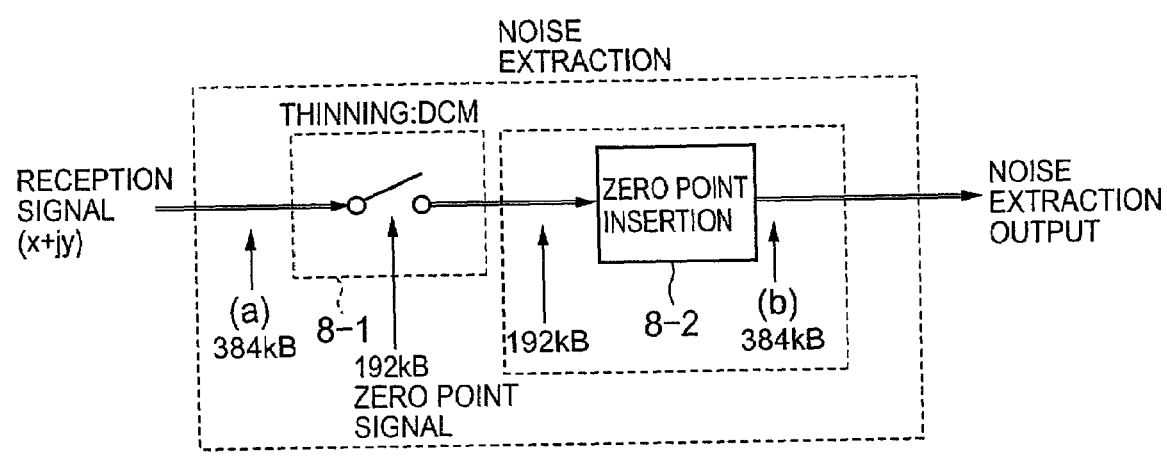
FIG. 21 is a functional block diagram of a noise extracting part in a noise predicting part according to the present invention.

FIG. 21 is a functional block diagram of the noise extracting part in the noise predicting part according to the present invention. The data signal component of the reception signal is removed by a thinning switching gate 8-1 which is on-off-controlled by the zero point timing signal output by a timing extracting part (TIM), and, thus, only a noise component is output. Then, the noise component is supplied to a zero point inserting part 8-2 constituted by an interpolation filter or the like, and is output after insertion of the interpolation predicted zero point.

Figure 22A:
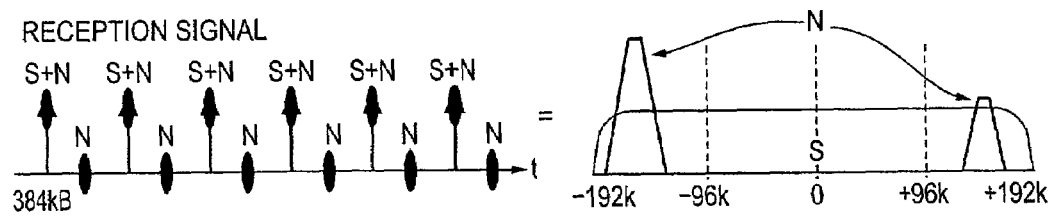
FIG. 22A is a time chart of the noise N and the data signal S contained in the reception signal on the left side, and an illustration of a frequency component of the noise and the data signal.
Figure 22B:
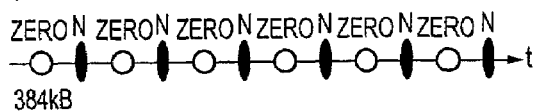
FIG. 22B is a time chart of the noise component.
Figure 22C:
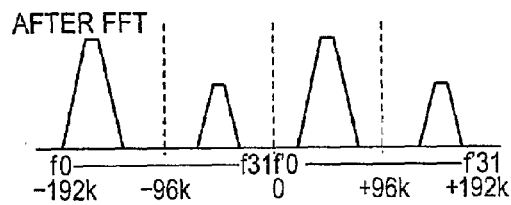
FIG. 22C is an illustration of a frequency component of the noise obtained by a fast Fourier transformation.
Figure 22D:
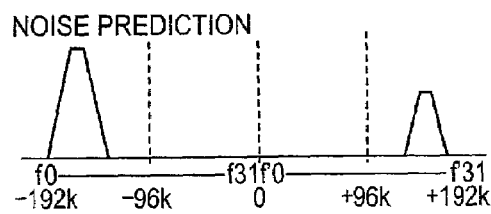
FIG. 22D is an illustration of a frequency component of the noise which is subjected to a noise prediction by comparing a pair of copied frequency components.
Figure 22E:
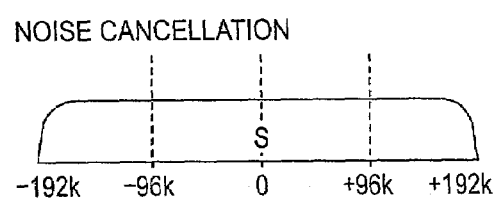
FIG. 22E is an illustration of the data signal on the frequency axis.

FIGS. 22A through 22E are illustrations for explaining a noise canceling operation by the noise prediction according to the present invention. FIG. 22A shows a time chart of the noise N and the data signal S contained in the reception signal on the left side, and also shows the frequency component of the noise N and the data signal S. FIG. 22B shows the noise component N, which is extracted by removing the data signal S by the noise extracting part 7-10 and inserting the zero point. FIG. 22C shows a frequency component of the thus-extracted noise N obtained by a fast Fourier transformation (FFT). FIG. 22D shows a frequency component of the noise which is subjected to a noise prediction by comparing a pair of copied frequency components. FIG. 22E shows the data signal S on the frequency axis, the data signal S being obtained by subtracting the noise shown in FIG. 22D obtained by the noise prediction from the reception signal shown in FIG. 22A and canceling the noise.

Figure 23:
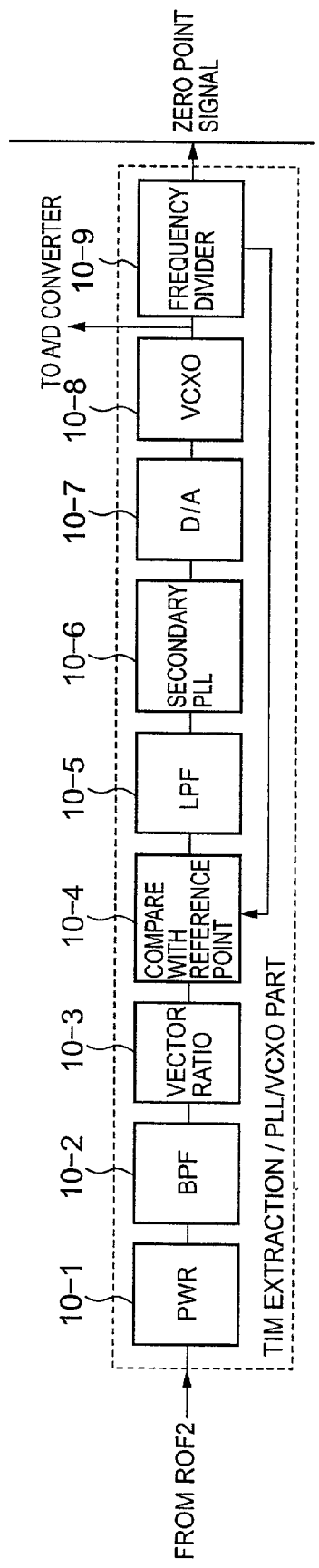
FIG. 23 is a functional block diagram of a timing extracting part (TIM) and a VCXO type phase locked loop circuit (PLL VCXO)

FIG. 23 is a functional block diagram of the timing extracting part (TIM) and the VCXO type phase locked loop circuit (PLL VCXO). The timing extracting part (TIM) comprises a power calculating circuit (PEW) 10-1 and a band-pass filter (BPF) 10-2 and a vectorizing circuit 10-3. The VCXO type phase locked loop circuit (PLL VCXO) comprises a comparing part 10-4, a low-pass filter (LPF) 10-5, a secondary PLL circuit 10-6, a digital/analog (D/A) converting circuit 10-7, a voltage controlled crystal oscillator (VCXO) circuit 10-8 and a frequency divider 10-9.

A vector signal output from the roll off filter (ROF29 of the reception side is subjected to a squaring operation by the power calculating circuit (PWR) 10-1 so as to calculate a power value. Since the transmission side periodically sends a zero point signal, the energy of this section is zero and a power spectrum corresponding to a rate of insertion of the zero point is extracted.

The thus-obtained power value is passes through the band-pass filter (BPF) 10-2 having a center frequency of 192 kHz so as to extract desired zero point information, which is sent to the vectorizing circuit 10-3. The vectorizing circuit 10-3 vectorizes the input signal by synthesizing with a signal having a phase difference by 90 degrees, and outputs the vectorized signal to the VCXO type phase locked loop circuit (PLL VCXO) as timing phase information.

In the VCXO type phase locked loop circuit (PLL VCXO), the timing phase information from the vectorizing circuit 10-3 is compared with a phase of a reference point by the comparing circuit 10-4, and the signal indicating the phase difference is passed through the low-pass filter (LPF) 10-5 so as to obtain a low-band component. The low-band component is passed through the secondary PLL circuit 10-6 constituted by two integrators, and is converted into an analog signal by the digital/analog (D/A) converter circuit 10-7. Then, an oscillation control signal of the voltage controlled crystal oscillator (VCXO) circuit 10-8 is controlled by the analog signal.

After dividing an output of the voltage controlled crystal oscillator (VCXO) circuit 10-8 by the frequency divider 10-9, the phase reference point of the voltage controlled crystal oscillator (VCXO) circuit 10-8 is always compared with the timing phase information. Thereby, the oscillation control voltage of the voltage controlled crystal oscillator (VCXO) circuit 10-8 is controlled so as to eliminate the phase difference between the timing phase information of the vectorizing circuit 10-3 and the reference point. Thus, the synchronized zero point signal is extracted, and a frequency synchronization with a remote station can be achieved.

Figure 24:
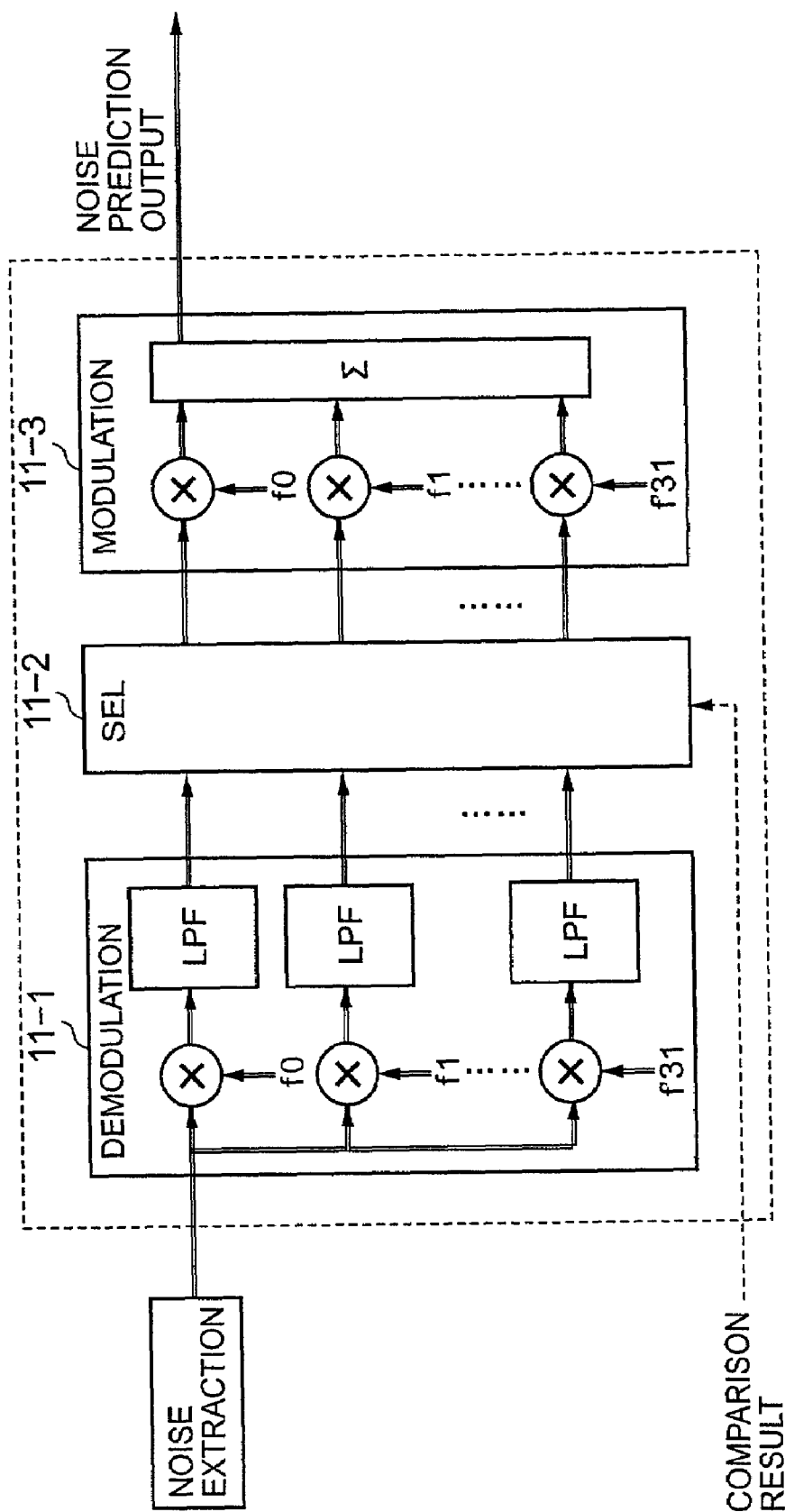
FIG. 24 is a block diagram of another example of the noise prediction according to the present invention.

FIG. 24 shows another example of the noise prediction according to the present invention. In this example, instead of the example shown in FIG. 20 in which the fast Fourier transformation and the noise prediction by an inverting transformation, the same process can be achieved by carrying out a demodulation and a modulation for each frequency component. A demodulating part 11-1 demodulates the output signal of the noise extracting part for the center frequency f0 to f31 of each band, and extracts a component of each band, which is shifted to a base band.

Similar to the selecting part (SEL) 7-22 shown in FIG. 20, a selecting part (SEL) 11-2 selects a larger nose based on a comparison of the pair of frequency components. A modulating part 11-3 demodulated the output of the selecting part 11-2 according to the center frequency f0 to f31 of each band so as to return to the original frequency, and synthesizes the components so as to obtain the noise prediction output.

Figure 25A:
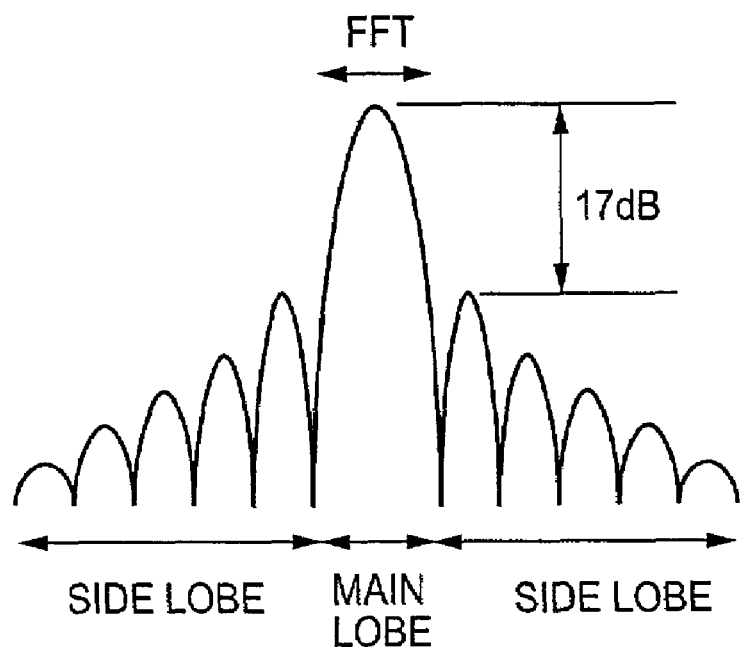
FIG. 25A is an illustration of a spectrum of a frequency component in an example of the present invention.
Figure 25B:
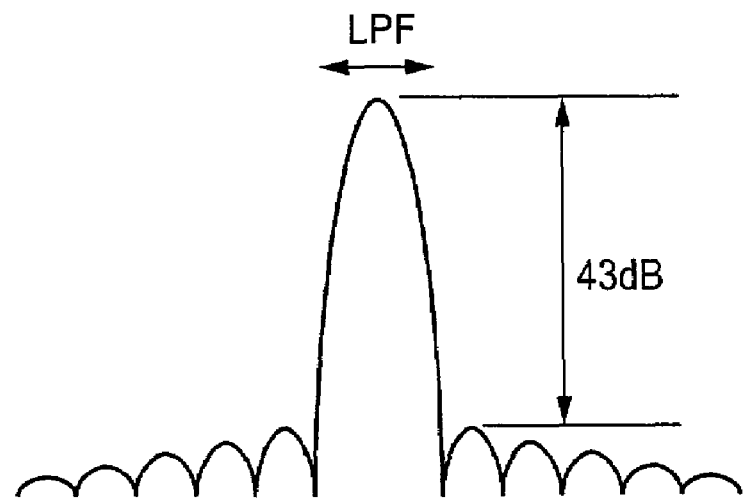
FIG. 25B is an illustration of a spectrum of a frequency component in another example of the present invention.

FIG. 25A is an illustration of a spectrum of a frequency component in the example of the present invention. FIG. 25B is an illustration of a spectrum of a frequency component in another example of the present invention. In the example shown in FIG. 25A in which a fast Fourier transformation is carried out, since attenuation of side lobe is only 17 dB, there is large leakage to adjacent band and an accurate noise prediction output may not be obtained. On the other hand, in the example shown in FIG. 25B in which the low-pass filter (LPF) is used, if a 100% $COS^2$ roll off filter is used, attenuation of side lobe as high as 43 dB is easily obtained, and, thereby, an extremely accurate noise prediction output can be obtained.

Figure 26:
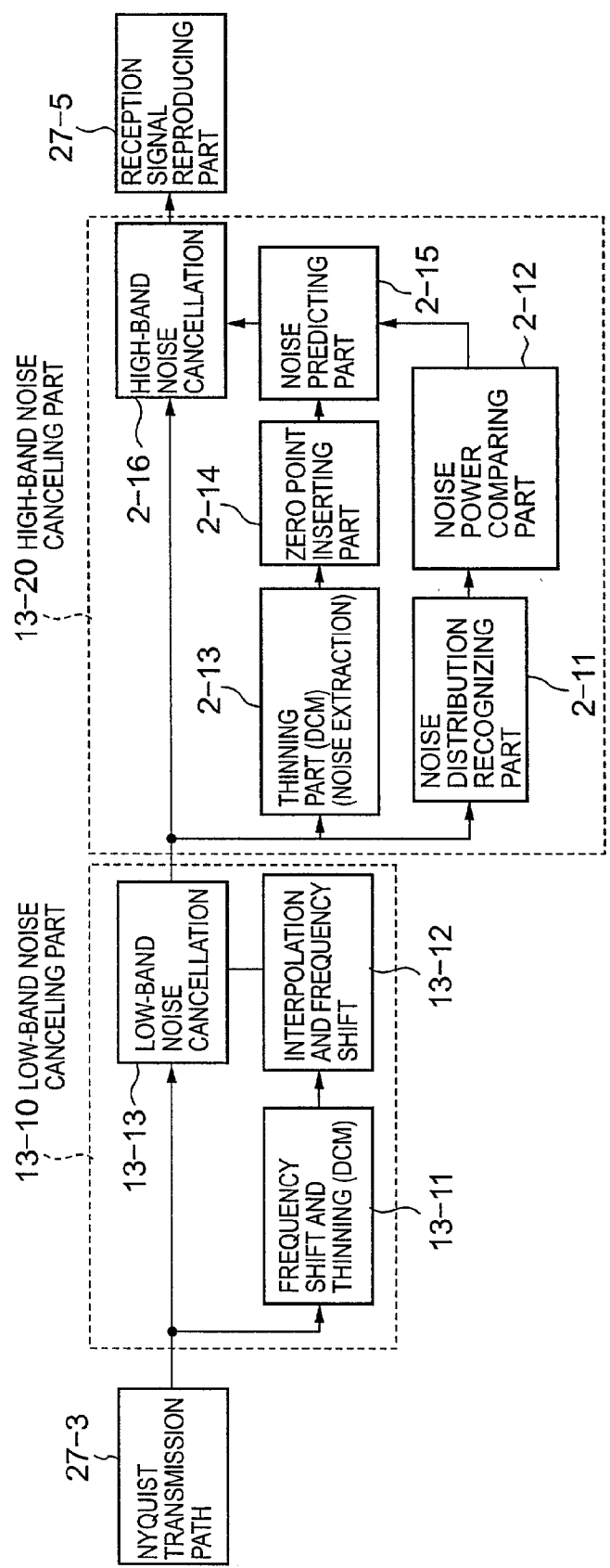
FIG. 26 is a functional block diagram of a low-band noise cancellation and a noise distribution recognition.

FIG. 26 is a functional block diagram of the low-band noise cancellation and the noise distribution recognition. In this example, a low-band noise canceling part 13-10 and a high-band noise canceling part 13-20 are provided. The low-band noise canceling part 13-10 cancels a low-band noise in the similar manner as the noise canceling part 27-4 shown in FIG. 4B. A frequency shifting and thinning part 13-11 of the low-band noise canceling part 13-10 corresponds to the frequency shifting part 27-41 and the tinning part (DCM) 27-42 shown in FIG. 4B. Similarly, interpolation and frequency shifting part 13-12 corresponds to the interpolating part 27-43 and the frequency reverse shifting part 27-44 shown in FIG. 4B. Additionally, the low-band noise canceling part 13-13 corresponds to the subtracting part 27-45 shown in FIG. 4B.

The high-band noise canceling part 13-20 applies a noise cancellation according to the above-mentioned noise distribution recognition shown in FIG. 15 with respect to a noise having a frequency higher than that cancelled by the low-band noise canceling part 13-10. Since each functional block in the high-band noise canceling part 13-20 is the same as that of the functional block shown in FIG. 15, blocks that are the same as the function blocks shown in FIG. 15 are given the same reference numerals and duplicate descriptions thereof will be omitted.

Figure 27A:
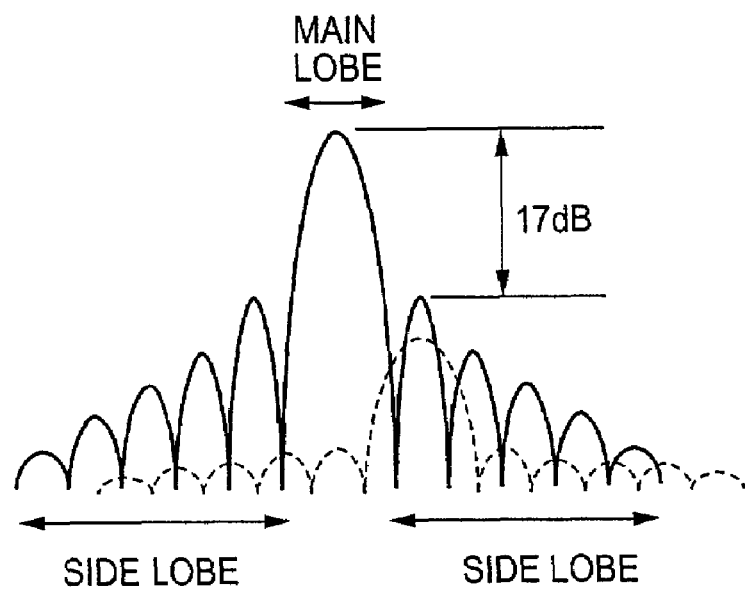
FIG. 27A is an illustration of side lobes of a fast Fourier transformation.
Figure 27B:
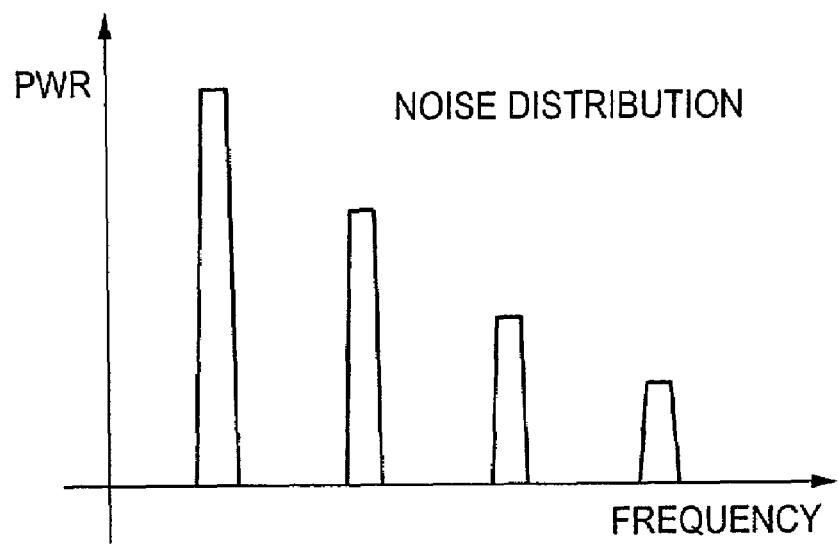
FIG. 27B is an illustration of noise components having interference by the side lobes.

According to the structure shown in FIG. 26, there is no deterioration in an accuracy of the noise distribution recognition, and noise cancellation can be accurately performed over the entire band. Especially in the power-line carrier, a noise is dominant in a low band, and when the low-band noise is large, the side lobe of the output of the fast Fourier transformation is large as shown in FIG. 27A. Thus, when the noise components are adjacent to each other as shown in FIG. 27B, an interference of the side lobe give to the adjacent band is increased, which results in deterioration of the accuracy of the noise distribution recognition in the low-band which receives the interference. However, by performing the noise distribution recognition after the low-band noise cancellation like the structure shown in FIG. 26, the accuracy of the noise distribution recognition can be prevented from being deteriorated.

FIGS. 28A through 28D are illustrations showing results of the noise cancellation by the noise distribution recognition according to the present invention.

Figures 28A, 28B, 28C, 28D:
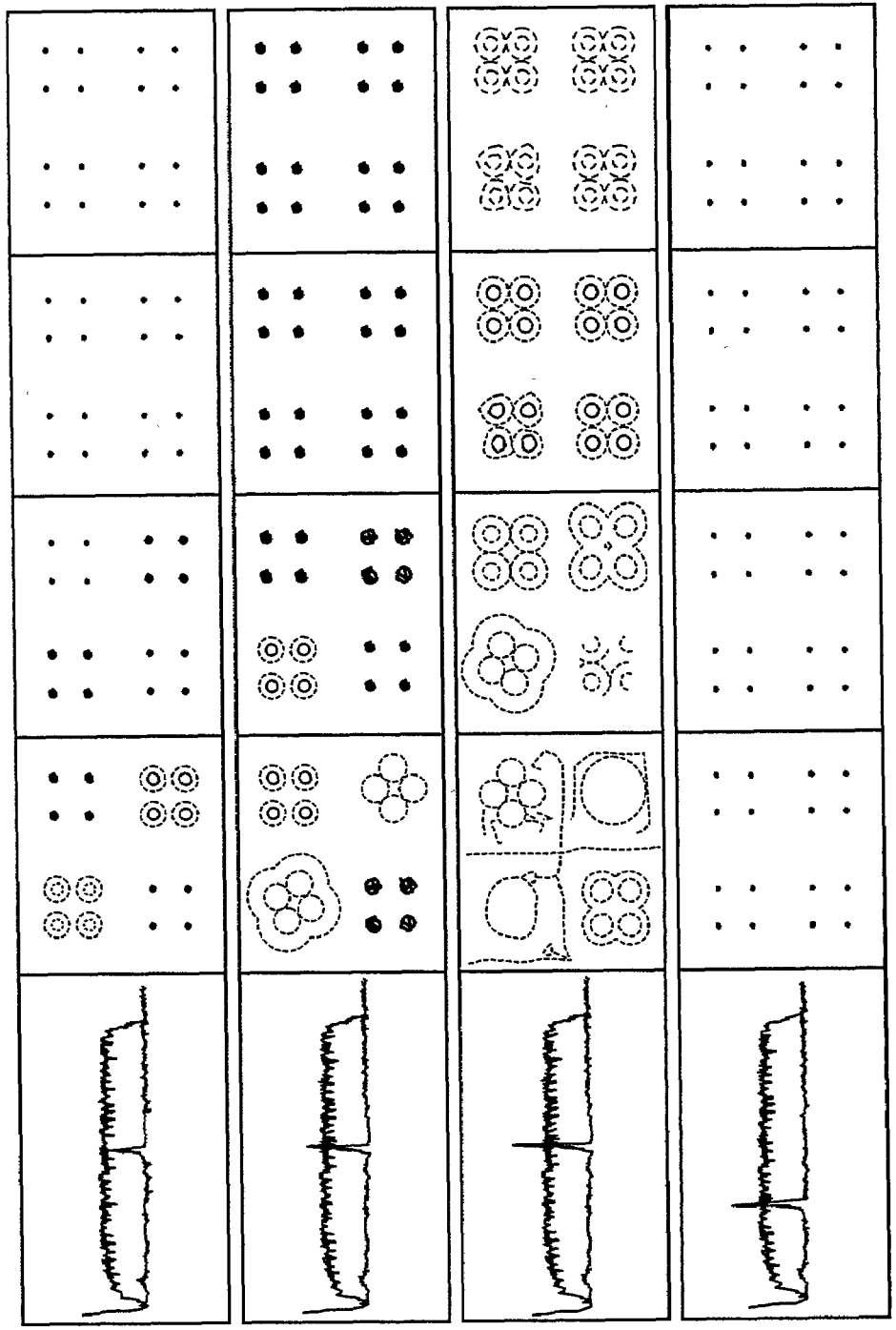
FIGS. 28A through 28D are illustrations of results of noise cancellation by the noise distribution recognition according to the present invention.

FIG. 28A shows a degree of eye-pattern degradation when the S/N value becomes 0 dB at a point of 248 kHz due to a tone noise of 248 kHz and noise cancellation is not performed. The degree of AI-deterioration is shown sequentially in four frequency bands on the right side.

Although the OFDM method is said to be resistant to a tone noise, it is limited to a case in which an S/N ratio for the tone noise is sufficiently maintained as in a telephone line or a radio communication line. If the S/N ratio is equal to about 0 dB (S/N=0 dB), the eye-pattern degradation is limited to a band concerned and there is less influence to other channel.

FIG. 28B shows a case in which the S/N value of a tone noise point of 248 kHz is −10 dB and noise cancellation is not performed. In this case, the eye-pattern degradation is generated in adjacent channels other than the channel corresponding to the tone noise frequency. However, a degree of eye-pattern degradation decreases as a frequency shifts away from the tone noise frequency.

FIG. 28C shows a case in which the S/N value of a tone noise point of 248 kHz is −20 dB and noise cancellation is not performed. In this case, eye-pattern degradation exceeding 100% is generated almost all channels, and it is almost impossible to carry out a communication in practice. This is because the general FDM method uses a broad filter in which a fast Fourier transformation (FFT) for channel separation itself decreases at sinx/x, and, thereby, the interference with adjacent channels cannot be sufficiently removed even if frequencies are different. Accordingly, in this case, it is difficult to carry out a communication under a noisy environment.

FIG. 28D shows a case in which the SIN value of a tone noise point of 152 kHz is −20 dB and noise cancellation is performed. There is less AI-degradation over all channels by noise cancellation even when the S/N ratio is −20 dB at which all channels are degraded, and it can be appreciated that a large effect is obtainable.

Figure 29:
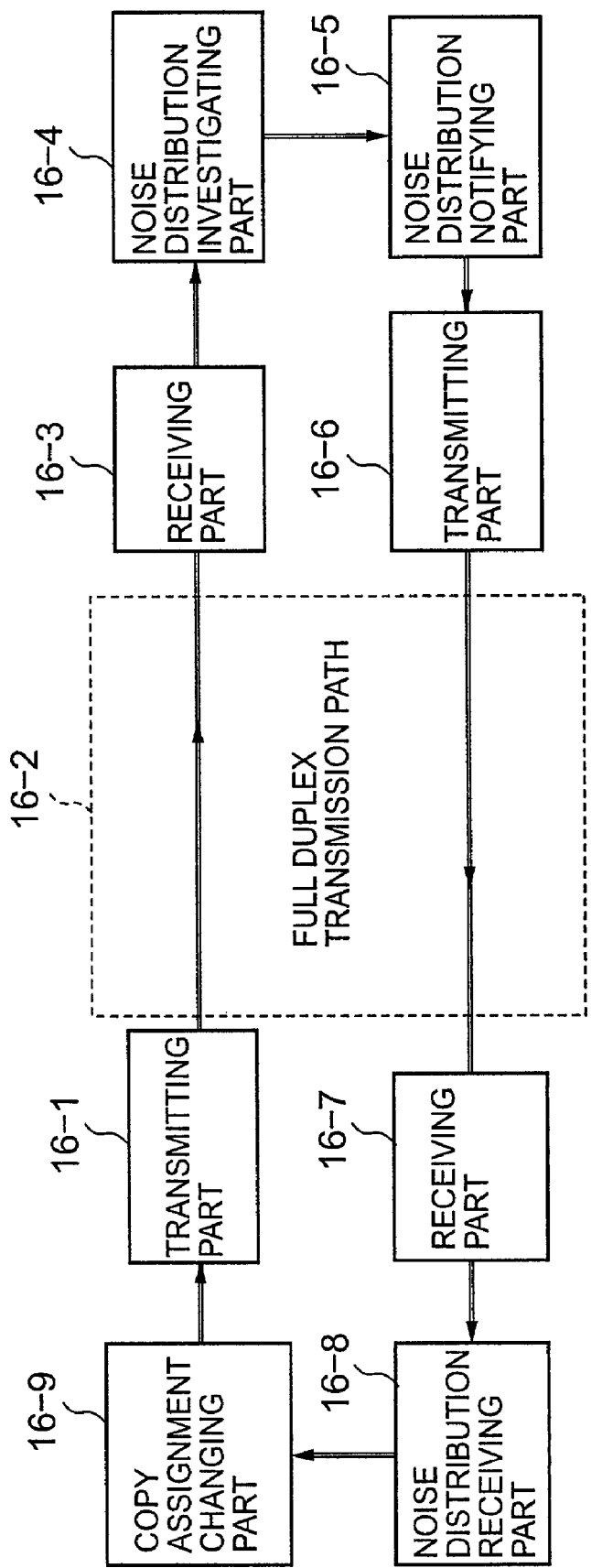
FIG. 29 is a block diagram of an example in which a rearrangement of channels is carried out in accordance with a noise distribution.

FIG. 29 is a block diagram of an example in which a rearrangement of channels is carried out in accordance with a noise distribution. In this example, a system control corresponds to notification of sending is sent to the transmission side. A reception part 16-3, which receives a signal from a transmission part 16-1 through a full duplex transmission path 16-2, investigates a noise distribution in the reception signal by a noise distribution investigating part 16-4, and send the result of investigation from a noise distribution notifying part 16-5 to a remote transmission station through a transmitting part 16-6.

The remote transmission station receives the notification by a receiving part 16-7, and recognizes a state of noise distribution in the reception side by a noise distribution receiving part 16-8. A copy assignment changing part 16-9 carries out a rearrangement of channels so that noises scattered on the transmission path are concentrated into a low band when the remote reception station restores the arrangement of the channels, and sends the rearranged channel signal from a transmitting part 16-1.

Upon reception of the rearranged channel signal, the reception side gathers the scattered noises in a low band by carrying out a channel change to restore the arrangement of the channels. Thus, if there is a large noise in scattered bands in a high band range, an effective noise cancellation can be achieved by carrying out the aforementioned low-band noise cancellation according to the present invention.

FIG. 30 shows another example of the zero point insertion. As shown in FIG. 30A, the zero point inserting part of the prior invention shown in FIG. 4B inserts the zero point between signals on a time axis after the signal points are generated in each channel as shown in FIG. 30A. For example, when a signal of 384 kb is generated by inserting zero points between signals of 192 kB, this means in a view point of frequency that a signal of a band of 192 kHz is copied to the adjoining band which results in generation off signal having a 384 kHZ band.

Accordingly, as a method for generating the same signal, there is a method as shown in FIG. 30B in which signal points of all channels are copied to an adjacent band so as to double the number of channels after signal points of each channel are output from a transmission signal generating part 17-1, and the signal on the frequency axis is converted into signal on the time axis by an inverting fast Fourier transforming part (IFFT) 17-3 and sends the converted signal to a nyquist transmission path 27-3.

Figure 31:
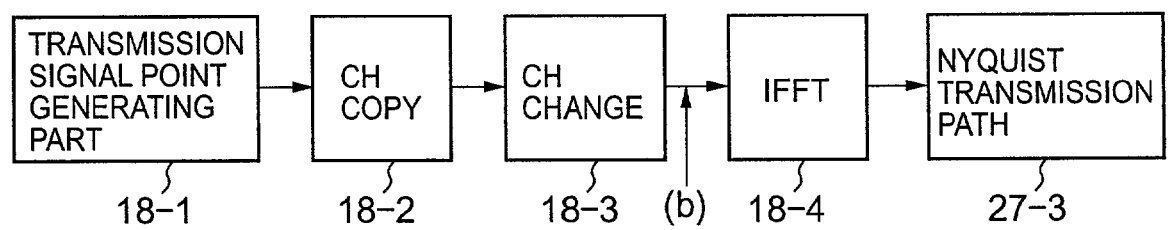
FIG. 31 is a functional block diagram of a structure of a transmission side which carries out a channel rearrangement in accordance with a noise distribution.

FIG. 31 is a functional block diagram of a structure of the transmission side which carries out a channel rearrangement in accordance with a noise distribution. A channel copy is carried out by a channel copying part 18-2 so as to cancel a low-band noise in the transmission signal output from a transmission signal point generating part 18-1. Additionally, the channels are changed by a channel changing part 18-3 based on the result of noise distribution recognition sent from the remote reception station. Further, the channels are rearranged so that the scattered noises on the transmission path are concentrated to a low band when restored in the remote reception station. The signal is sent to the nyquist transmission path 27-3 after being converted into a signal on the time axis by an inverting Fourier transforming part 18-4.

Figure 32:
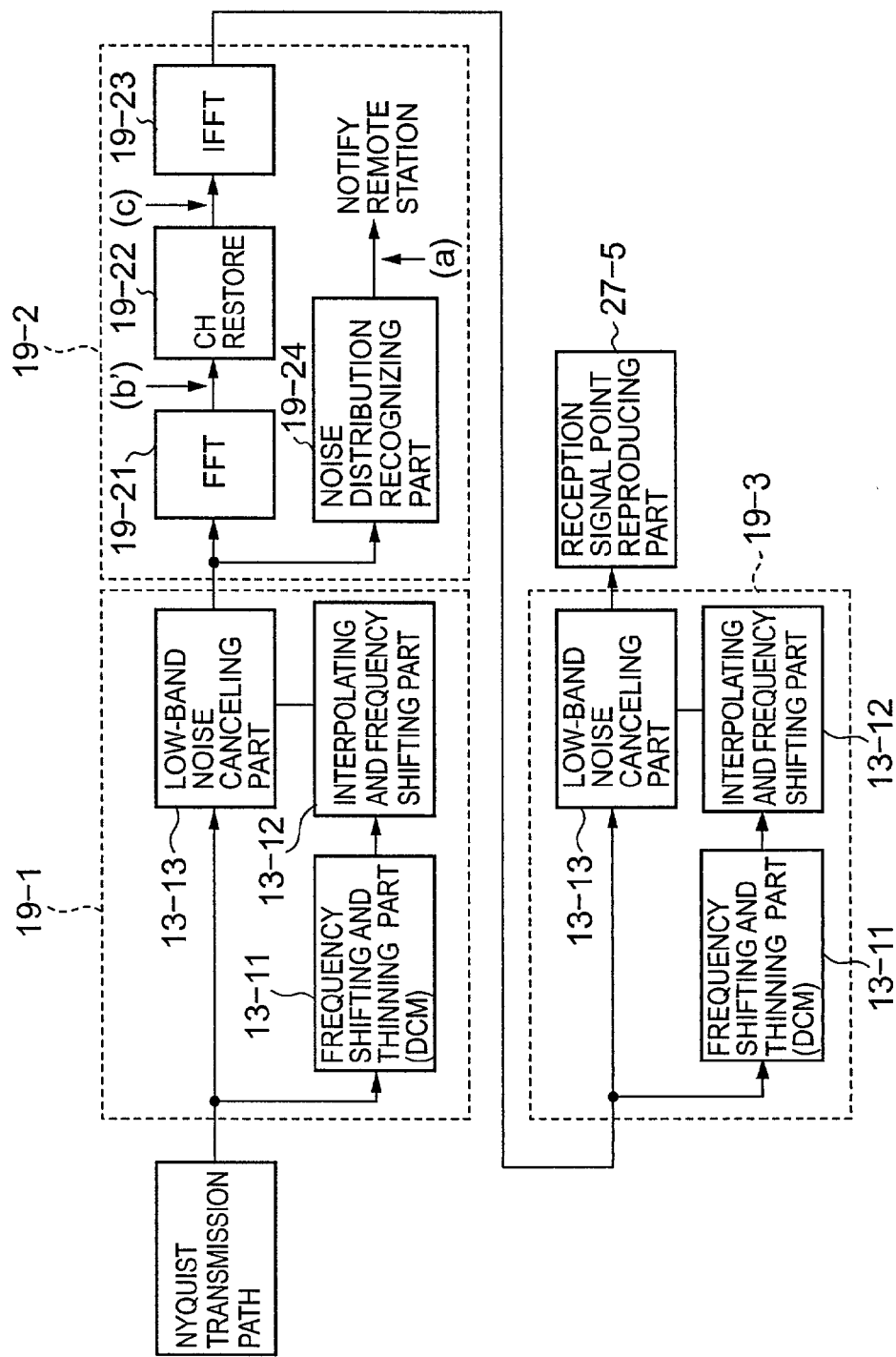
FIG. 32 is a functional block diagram of a structure of a reception side for rearranging channels according to a noise distribution.

FIG. 32 is a functional block diagram of structure of the reception side for rearranging channels according to a noise distribution. First, a low band noise of the signal received from the nyquist transmission path 27-3 is canceled by a first low-band noise canceling part 19-1. The first low-band noise canceling part 19-1 is the same as the low-band noise canceling part 13-10 shown in FIG. 26.

Thereafter, in a channel rearranging part 19-2, components of channels output from a fast Fourier transforming part (FFT) 19-21 are restored to the original order by a channel restoring part 19-22, thereby rearranging the channels so that the scattered noises on the transmission path are concentrated into a low band. Then, the signal is converted into a time sequence signal by an inverting fast Fourier transforming part (IFFT) 19-23, and is output to a second low-band noise canceling part 19-3. At this time, a noise distribution is simultaneously recognized by a noise distribution recognizing part 19-24, and the recognized noise distribution is sent to a remote station.

The second low-band noise canceling part 19-3 has a structure the same as the structure of the low-band noise canceling part 13-1 shown in FIG. 26. Thus, large noises in a scattered bands on a high band can be effectively canceled by canceling the noises gathered to a low-band side by the channel rearrangement.

Figure 33:
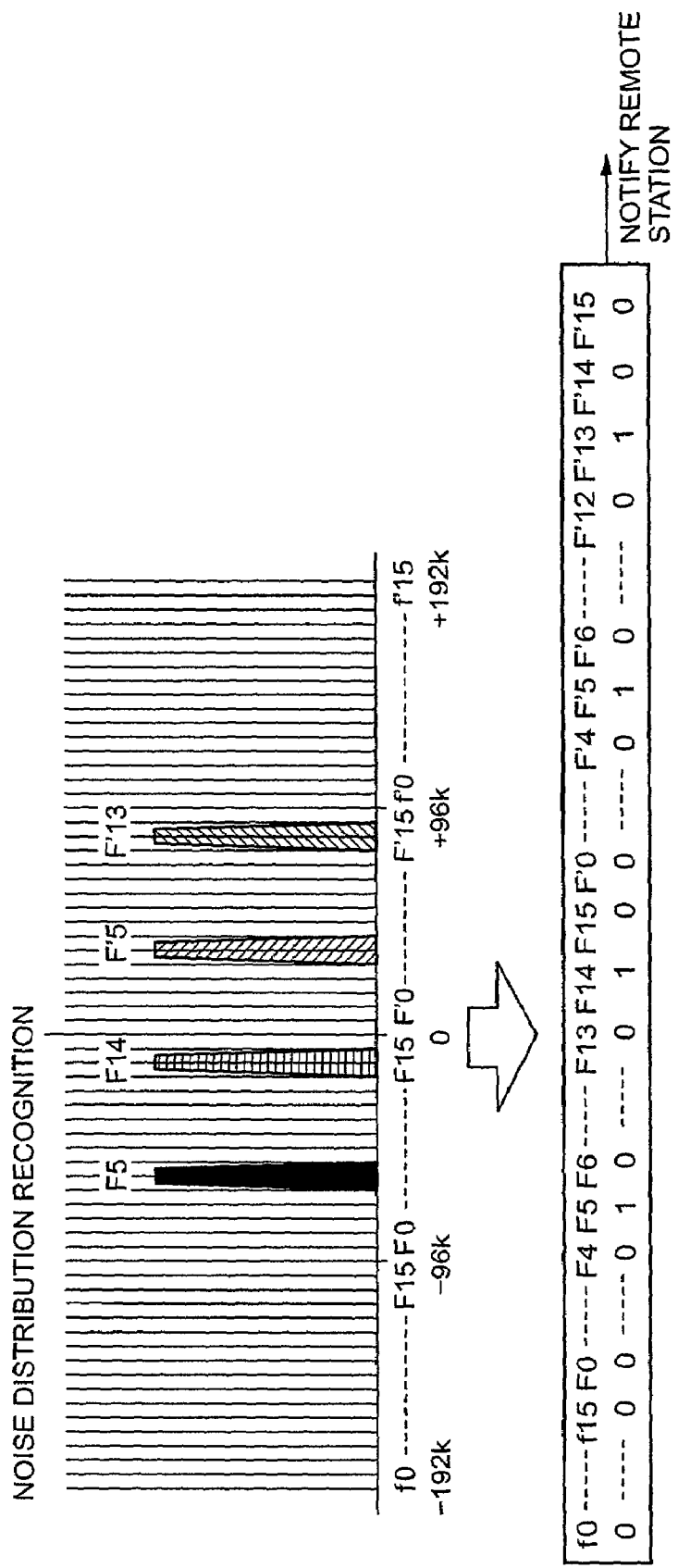
FIG. 33 is an illustration showing an example of a noise distribution detected by a noise distribution recognition part on a reception side.
Figure 34:
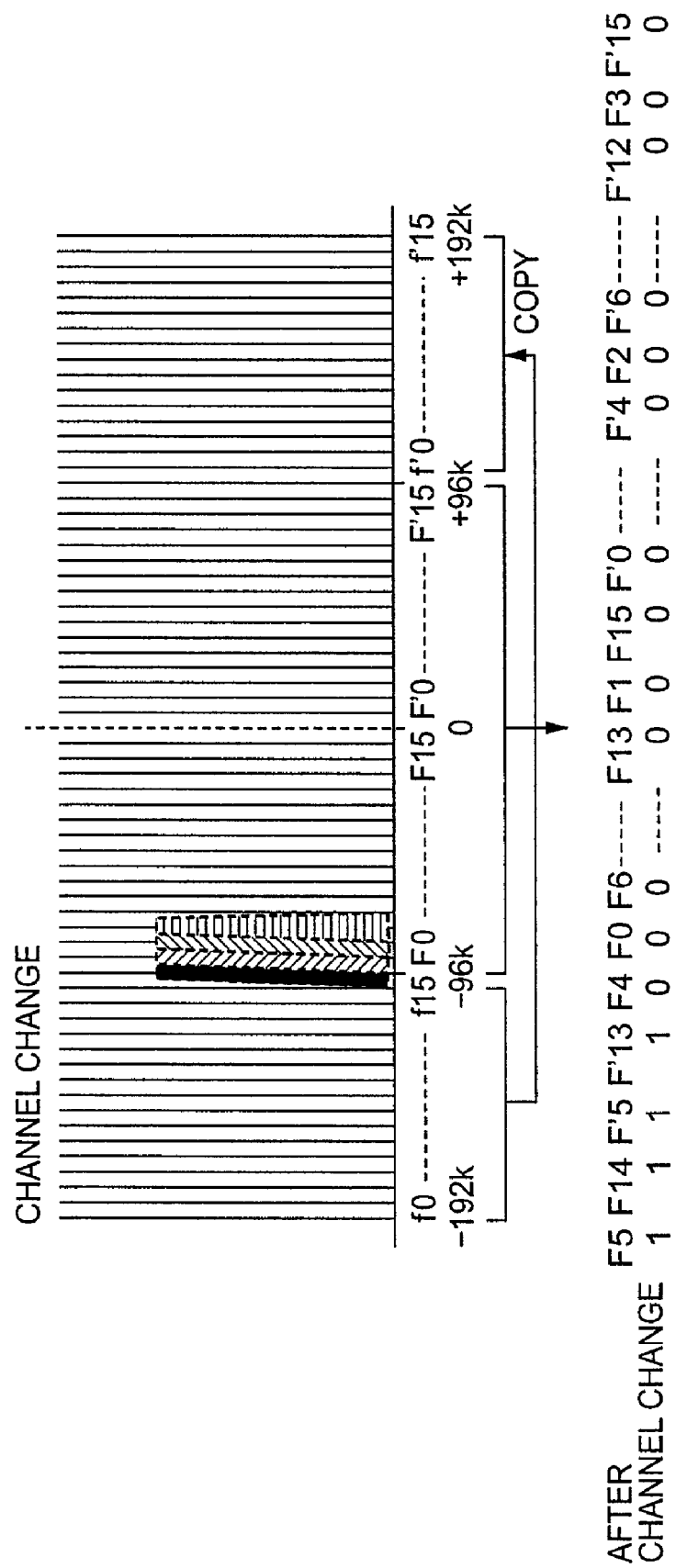
FIG. 34 is an illustration showing an example of a rearrangement of channels on a transmission side.
Figure 35:
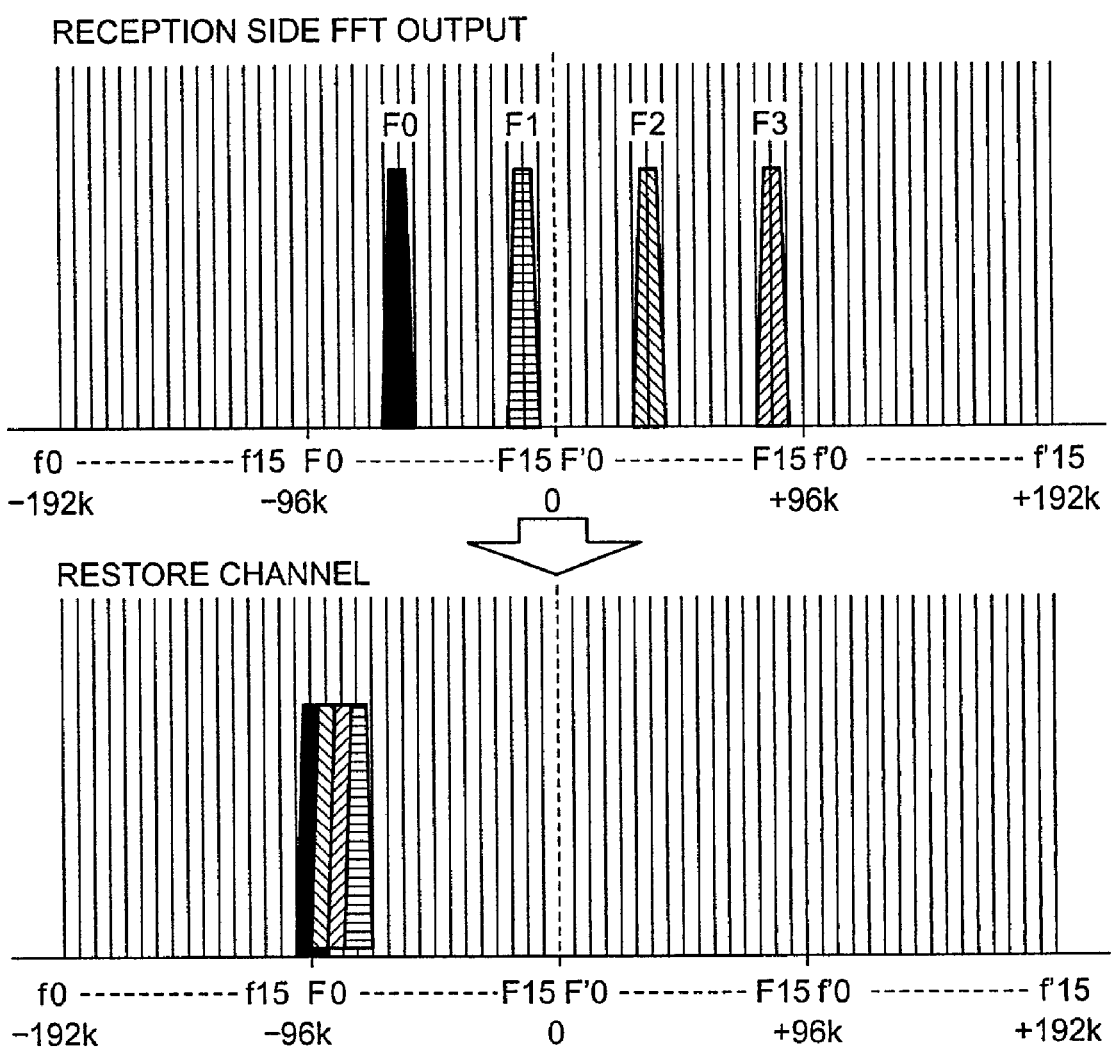
FIG. 35 is an illustration showing a noise distribution of reception signal and a noise distribution after restoration of channels on a reception side.

FIGS. 33, 34 and 35 show a channel rearranging operation according to a noise distribution. FIG. 33 shows an example of a noise distribution detected by a noise distribution recognition part in the reception side. The reception side investigates a noise distribution using a no-transmission energy section (NTE frame), and represents "1" or "0" as to whether a noise has a constant value for each frequency band, and notifies the remote station of the result of investigation. FIG. 33 indicates an example in which noises in the bands F5, F14, F'5 and F'13 exceed a predetermined value. It should be noted that the noise distribution recognition corresponds to the output of the noise distribution recognizing part 19-24 shown in FIG. 32.

FIG. 34 shows an example of a rearrangement of the channels on the transmission side. On the transmission side, a channel copy is carried out first so as to cancel a low-band noise. In this example, the zero point is inserted every three signals, and the 16 channels f0 to f15 show in the figure are copied to the channels f'0 to f15.

Then, in accordance with the result of noise distribution recognition notified by the remote station, the channels represented as "1" (noise exists) are sequentially replaced by the channels represented as "0" (no noise) after the channel F0. That is, in this example, the channels F5, F14, F'5 and F'13 is replaced by the channels F0, F1, F2 and F3, respectively. At this time, the channels are arranged so that the channels F0 to F15 and the channels F'0 to F'15 have a copied relationship when they are restored on the reception side. It should be noted that the signal after the change corresponds to the output of the channel changing part 18-3 shown in FIG. 31.

FIG. 35 shows a noise distribution of the reception signal and a noise distribution after restoration of channels on the reception side. First, a low-band noise cancellation is carried out for the channels f0 to f15. After a fast Fourier transformation (FFT), a transmission path noise appears in the channels corresponding to the original F0, F1, F2 and F3. When change of channels is carried out so as to restore the original channels based on the result of noise distribution recognition, the noise distribution on the lower part of the figure is obtained.

After restoring the original channels, the channels F0 to F15 and the channels F'0 to F'15 are in a copied relationship. Accordingly, the scattered noises are cancelled by carrying out the aforementioned low-band noise cancellation. It should be noted that the signals shown in the upper part of FIG. 35 correspond to the output of the fast Fourier transforming part 19-2 shown in FIG. 32, and the signals shown in the lower part of FIG. 35 correspond to the output of the channel restore part 19-22 shown in FIG. 32.

Figure 36:
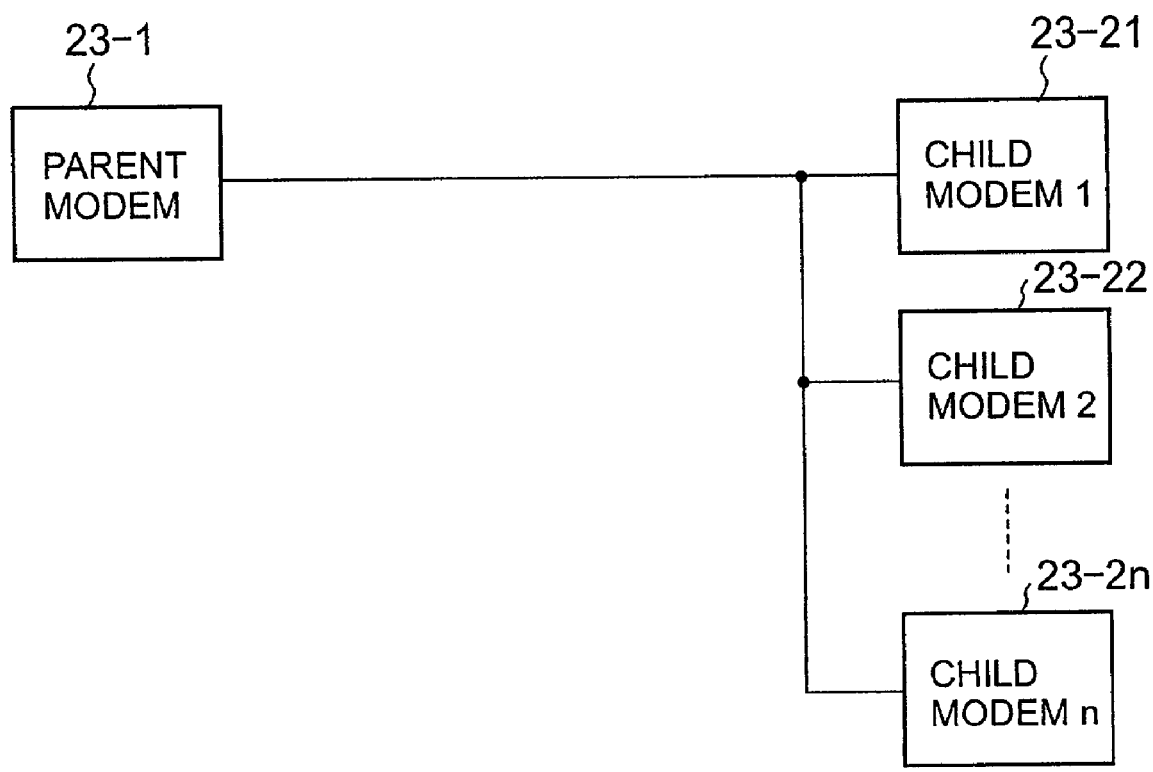
FIG. 36 is an illustration showing a transmission and reception system having a one-to-n branch connection.

Although descriptions have been given of the example in which the present invention is applied to the transmission and reception system having the transmission side and the reception side on one-to-one basis, the present invention is not limited to such a system, and the present invention is also applicable to a transmission and reception system having a one-to-n branch connection such as an example shown in FIG. 36 in which n child modems 23-21 to 23-2$n$ are connected to one parent modem 23-1.

Particularly, if it is desired to use a modem in the pole transformer as the parent modem 23-1 and use modes provided in houses as the n child modems 23-21 to 23-2$n$, a noise distribution due to an AM broadcasting carrier is common to the child modems 23-21 to 23-2$n$. Thus, the parent modem 23-1 can commonly apply the channel change to each of the child modems 23-21 to 23-2$n$ so as to cancel the scattered noises.

The present invention is not limited to the specifically disclosed embodiments, and variations and modifications may be made without departing from the scope of the present invention.

The present application is based on Japanese priority application No. 2001-186276 filed on Jun. 20, 2001, the entire contents of which are hereby incorporated by reference.

What is claimed is:

1. A noise canceling method comprising the steps of:
receiving a specific signal having a specified time position, amplitude and phase;
recognizing a noise distribution of the specific signal;
predicting a noise by comparing noise components of a pair of copied frequencies with each other and extracting a frequency band having a larger noise component from the pair of copied frequencies generated by insertion of the specific signal; and
reproducing a transmitted original signal by canceling the predicted noise from a reception signal.

2. The noise canceling method as claimed in claim 1, wherein said specific signal is a zero point signal having an amplitude of zero, and the zero point signal is periodically inserted into the transmitted original signal.

3. A noise canceling method comprising the steps of:
receiving a reception signal containing a specific signal and a no-transmission energy section during which no periodical transmission is made, the specific signal having a specified time position, amplitude and phase;
extracting a noise component from the specific signal of the reception signal, interpolation-predicting a noise of a data signal point, and canceling a noise of a specific band by removing the predicted noise from the reception signal; and
recognizing a noise distribution of the no-transmission energy section of the reception signal, predicting a noise by comparing noise components of a pair of copied frequencies with each other and extracting a frequency band having a larger noise component from the pair of copied frequencies generated by insertion of the specific signal, and canceling a large level noise by removing the predicted noise from the reception signal.

4. The noise canceling method as claimed in claim 3, wherein said specific signal is a zero point signal having an amplitude of zero, and the zero point signal is periodically inserted into the transmitted original signal.

5. A noise canceling method comprising the steps of:
receiving, by a reception side, a reception signal containing a specific signal and a no-transmission energy section during which no periodical transmission is made, the specific signal having a specified time position, amplitude and phase;
investigating a noise distribution of the reception signal during the no-transmission energy section;
notifying a transmission side of the investigated noise distribution;
changing, by the transmission side, an order of channels based on the noise distribution notified by the reception side so that channels having a large noise are gathered in a specific band;
sending a signal subjected to the channel change to the reception side;
restoring, by the reception side, the order of channels, which has been changed by the transmission side, to an original order;
extracting a noise component of a specific band from the specific signal of the reception signal having channels in the restored order;
interpolation-predicting a noise of a data signal point; and
canceling a noise of the specific band by removing the interpolation-predicted noise from the reception signal.

6. The noise canceling method as claimed in claim 5, wherein said specific signal is a zero point signal having an amplitude of zero, and the zero point signal is periodically inserted into the transmitted original signal.

7. A noise canceling apparatus comprising:
means for receiving a specific signal having a specified time position, amplitude and phase;
means for recognizing a noise distribution of the specific signal;
means for predicting a noise by comparing noise components of a pair of copied frequencies with each other and extracting a frequency band having a larger noise component from the pair of copied frequencies generated by insertion of the specific signal; and means for reproducing a transmitted original signal by canceling the predicted noise from a reception signal.

8. The noise canceling apparatus as claimed in claim 7, wherein said specific signal is a zero point signal having an amplitude of zero, and the zero point signal is periodically inserted into the transmitted original signal.

9. A noise canceling apparatus comprising:

means for receiving a reception signal containing a specific signal and a no-transmission energy section during which no periodical transmission is made, the specific signal having a specified time position, amplitude and phase;

means for extracting a noise component from the specific signal of the reception signal, interpolation-predicting a noise of a data signal point, and canceling a noise of a specific band by removing the predicted noise from the reception signal; and means for recognizing a noise distribution of the no-transmission energy section of the reception signal, predicting a noise by comparing noise components of a pair of copied frequencies with each other and extracting a frequency band having a larger noise component from the pair of copied frequencies generated by insertion of the specific signal, and canceling a large level noise by removing the predicted noise from the reception signal.

10. The noise canceling apparatus as claimed in claim 9, wherein said specific signal is a zero point signal having an amplitude of zero, and the zero point signal is periodically inserted into the transmitted original signal.

11. The noise canceling apparatus as claimed in claim 9, wherein said means for recognizing a noise distribution comprises means for transforming the reception signal during the no-transmission energy section by a fast Fourier transformation method.

12. A noise canceling apparatus comprising:

means, provided on a reception side, for receiving a reception signal containing a specific signal and a no-transmission energy section during which no periodical transmission is made, the specific signal having a specified time position, amplitude and phase;

means, provided on the reception side, for investigating a noise distribution of the reception signal during the no-transmission energy section;

means, provided on the reception side, for notifying a transmission side of the investigated noise distribution;

means, provided on a transmission side, for changing, by the transmission side, an order of channels based on the noise distribution notified by the reception side so that channels having a large noise are gathered in a specific band;

means, provided on the transmission side, for sending a signal subjected to the channel change to the reception side;

means, provided on the reception side, for restoring the order of channels, which has been changed by the transmission side, to an original order;

means, provided on the reception side, for extracting a noise component of a specific band from the specific signal of the reception signal having channels in the restored order;

means, provided on the reception side, for interpolation-predicting a noise of a data signal point; and means, provided on the reception side, for canceling a noise of the specific band by removing the interpolation-predicted noise from the reception signal.

13. The noise canceling apparatus as claimed in claim 12, wherein said specific signal is a zero point signal having an amplitude of zero, and the zero point signal is periodically inserted into the transmitted original signal.

14. The noise canceling apparatus as claimed in claim 12, wherein said means for investigating a noise distribution comprises a low-pass filter and means for demodulating the reception signal during the no-transmission energy section on an individual frequency band basis.

\* \* \* \* \*